United States Patent
Harris

(10) Patent No.: US 10,562,702 B2
(45) Date of Patent: *Feb. 18, 2020

(54) SYSTEMS AND METHODS FOR BULK MATERIAL STORAGE AND/OR TRANSPORT

(71) Applicant: SandBox Logistics, LLC, Houston, TX (US)

(72) Inventor: Robert A. Harris, Arlington, TX (US)

(73) Assignee: SANDBOX LOGISTICS, LLC, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/219,640

(22) Filed: Jul. 26, 2016

(65) Prior Publication Data

US 2016/0332809 A1    Nov. 17, 2016

Related U.S. Application Data

(62) Division of application No. 13/625,675, filed on Sep. 24, 2012.

(Continued)

(51) Int. Cl.
*B65D 88/30*    (2006.01)
*B65B 1/06*    (2006.01)
(Continued)

(52) U.S. Cl.
CPC ............... *B65D 88/30* (2013.01); *B65B 1/06* (2013.01); *B65D 88/32* (2013.01); *B65D 88/54* (2013.01);
(Continued)

(58) Field of Classification Search
CPC .......... B65G 69/0441; B65G 2201/042; B65G 2201/045; B65D 88/26; B65D 88/28;
(Continued)

(56) References Cited

U.S. PATENT DOCUMENTS 137,871 A    4/1873 Worsley
150,894 A    5/1874 Safely
(Continued)

FOREIGN PATENT DOCUMENTS

CA    2023138    2/1992
CA    2791088    3/2013
(Continued)

OTHER PUBLICATIONS

FS-35 Desert Frac-Sanders. NOV (National Oilwell Varco). Mar. 19, 2012. (https://web.archive.org/web/20120319070423/http://www.nov.com/Well_Service_and_Completion/Frac_Sand_Handling_Equipment/Frac_Sanders/FS-35.aspx).
(Continued)

*Primary Examiner* — Timothy P. Kelly
(74) *Attorney, Agent, or Firm* — LKGlobal | Lorenz & Kopf, LLP

(57) ABSTRACT

Bulk material storage units that can be placed on flatbeds that can be hauled in various manners, including rail cars or trucks, to the destination and removed from the flatbed for temporary storage at the destination, freeing the transportation mode, e.g., rail cars or trucks, to be used elsewhere. Embodiments of the bulk material storage unit of the present invention replace rail hopper cars or truck trailers to hold the bulk material during transportation as well as provide temporary storage at the desired location, e.g., the origin or destination, without tying up transportation resources.

18 Claims, 11 Drawing Sheets

Related U.S. Application Data

(60) Provisional application No. 61/538,616, filed on Sep. 23, 2011.

(51) Int. Cl.

| | | |
|---|---|---|
| *B65D 88/32* | (2006.01) | |
| *B65D 88/54* | (2006.01) | |
| *B65D 90/00* | (2006.01) | |
| *B65D 90/20* | (2006.01) | |
| *B65D 90/54* | (2006.01) | |
| *B65G 57/02* | (2006.01) | |
| *B65G 67/02* | (2006.01) | |

(52) U.S. Cl.
CPC ......... *B65D 90/0033* (2013.01); *B65D 90/20* (2013.01); *B65D 90/54* (2013.01); *B65G 57/02* (2013.01); *B65G 67/02* (2013.01); *B65G 2201/0235* (2013.01)

(58) Field of Classification Search
CPC .... B65D 88/12; B65D 88/128; B65D 88/129; B65D 88/126; B65D 88/121; B65D 88/30; B65D 88/32; B61D 7/02
USPC ................... 141/286, 231; 414/328; 52/197; 222/166; 206/598; 239/504
See application file for complete search history.

(56) References Cited

U.S. PATENT DOCUMENTS

| | | |
|---|---|---|
| 384,443 A | 6/1888 | Hoover |
| 448,238 A | 3/1891 | Johnson |
| 710,611 A | 10/1902 | Ray |
| 711,632 A | 10/1902 | Johnson |
| 917,649 A | 4/1909 | Otto |
| 1,143,641 A | 6/1915 | McGregor |
| 1,331,883 A | 2/1920 | Stuart |
| 1,344,768 A | 6/1920 | Messiter |
| 1,434,488 A | 11/1922 | Forsythe et al. |
| 1,520,560 A | 12/1923 | Burno |
| 1,506,936 A | 9/1924 | Lea |
| 1,526,527 A | 2/1925 | Butler |
| 1,573,664 A | 2/1926 | Wetherill |
| 1,807,447 A | 5/1931 | Smith |
| 1,850,000 A | 3/1932 | Fernand |
| 1,932,320 A | 10/1933 | Steward |
| 1,973,312 A | 9/1934 | Hardinge |
| 2,020,628 A | 11/1935 | Woodruff |
| 2,233,005 A | 2/1941 | Garlinghouse |
| 2,255,448 A | 9/1941 | Morris |
| 2,293,160 A | 8/1942 | Miller et al. |
| 2,368,672 A | 2/1945 | McNamara |
| 2,381,103 A | 8/1945 | Frank |
| 2,385,245 A | 9/1945 | Willoughby |
| 2,413,661 A | 12/1946 | Stokes |
| 2,423,879 A | 7/1947 | De Frees |
| 2,563,470 A | 8/1951 | Kane |
| 2,564,020 A | 8/1951 | Mengel |
| 2,603,342 A | 7/1952 | Martinson |
| 2,616,758 A | 11/1952 | Meyers |
| 2,622,771 A | 12/1952 | Tulou |
| 2,652,174 A | 9/1953 | Shea et al. |
| 2,670,866 A | 3/1954 | Glesby |
| 2,678,145 A | 5/1954 | Ejuzwiak et al. |
| 2,693,282 A | 11/1954 | Sensibar |
| 2,700,574 A | 1/1955 | Tourneau |
| 2,792,262 A | 4/1955 | Hathom |
| 2,774,515 A | 12/1956 | Johansson et al. |
| 2,791,973 A | 5/1957 | Dorey |
| 2,801,125 A | 7/1957 | Page et al. |
| 2,808,164 A | 10/1957 | Glendinning |
| 2,812,970 A | 11/1957 | Martinson |
| 2,837,369 A | 6/1958 | Stopps |
| 2,865,521 A | 12/1958 | Fisher et al. |
| 2,873,036 A | 2/1959 | Noble |
| 2,894,666 A | 7/1959 | Campbell, Jr. |
| 2,988,235 A | 6/1961 | Ronyak |
| 2,994,460 A | 8/1961 | Matthews |
| 3,041,113 A | 6/1962 | Sackett |
| 3,049,248 A | 8/1962 | Heltzel et al. |
| 3,064,832 A | 11/1962 | Heltzel |
| 3,083,879 A | 4/1963 | Coleman |
| 3,090,527 A | 5/1963 | Rensch |
| 3,109,389 A | 11/1963 | Karlsson |
| 3,122,258 A | 2/1964 | Raymond |
| 3,134,606 A | 5/1964 | Oyler |
| 3,135,432 A | 6/1964 | McKinney |
| 3,163,127 A | 12/1964 | Gutridge et al. |
| 3,187,684 A | 6/1965 | Ortner |
| 3,198,494 A | 8/1965 | Curran et al. |
| 3,199,585 A | 8/1965 | Cronberger |
| 3,248,026 A | 4/1966 | Kemp |
| 3,255,927 A | 6/1966 | Ruppert et al. |
| 3,265,443 A | 8/1966 | Simas |
| 3,270,921 A | 9/1966 | Nadolske et al. |
| 3,281,006 A | 10/1966 | Tohchung |
| 3,294,306 A | 12/1966 | Areddy |
| 3,318,473 A | 5/1967 | Jones et al. |
| 3,326,572 A | 6/1967 | Murray |
| 3,343,688 A | 9/1967 | Ross |
| 3,353,599 A | 11/1967 | Swift |
| 3,354,918 A | 11/1967 | Coleman |
| 3,378,152 A | 4/1968 | Warner |
| 3,387,570 A | 6/1968 | Pulcrano et al. |
| 3,396,675 A | 8/1968 | Stevens |
| 3,397,654 A | 8/1968 | Snyder |
| 3,406,995 A | 10/1968 | McCarthy |
| 3,407,971 A | 10/1968 | Oehler |
| 3,425,599 A | 2/1969 | Sammarco et al. |
| 3,455,474 A | 7/1969 | Truncali |
| 3,476,270 A | 11/1969 | Cox et al. |
| 3,486,787 A | 12/1969 | Campbell |
| 3,499,694 A | 3/1970 | Coppel |
| 3,508,762 A | 4/1970 | Pratt |
| 3,524,567 A | 8/1970 | Coleman |
| 3,528,570 A | 9/1970 | Pase |
| 3,561,633 A | 2/1971 | Morrison et al. |
| 3,587,834 A | 6/1971 | Dugge |
| 3,596,609 A | 8/1971 | Ortner |
| 3,601,244 A | 8/1971 | Ort et al. |
| 3,602,400 A | 8/1971 | Cooke |
| 3,650,567 A | 3/1972 | Danielson |
| 3,653,521 A | 4/1972 | Bridge |
| 3,661,293 A | 5/1972 | Gerhard et al. |
| 3,692,363 A | 9/1972 | Tenebaum et al. |
| 3,704,797 A | 12/1972 | Suykens |
| 3,721,199 A | 3/1973 | Hassenauer |
| 3,729,121 A | 4/1973 | Cannon |
| 3,734,215 A | 5/1973 | Smith |
| 3,738,511 A | 6/1973 | Lemon et al. |
| 3,752,511 A | 8/1973 | Racy |
| 3,777,909 A | 12/1973 | Rheinfrank |
| 3,785,534 A | 1/1974 | Smith |
| 3,800,712 A | 4/1974 | Krug, Jr. |
| 3,802,584 A | 4/1974 | Sackett |
| 3,817,261 A | 6/1974 | Rogge |
| 3,820,762 A | 6/1974 | Bostrom et al. |
| 3,827,578 A | 8/1974 | Hough |
| 3,840,141 A | 10/1974 | Allom et al. |
| 3,854,612 A | 12/1974 | Snape |
| 3,861,716 A | 1/1975 | Baxter et al. |
| 3,883,005 A | 5/1975 | Stevens |
| 3,904,105 A | 9/1975 | Booth |
| 3,909,223 A | 9/1975 | Schmidt |
| 3,913,933 A | 10/1975 | Visser et al. |
| 3,933,100 A | 1/1976 | Dugge |
| 3,963,149 A | 6/1976 | Fassauer |
| 3,970,123 A | 7/1976 | Poulton et al. |
| 3,986,708 A | 10/1976 | Hellzel et al. |
| 3,997,089 A | 12/1976 | Clarke et al. |
| 3,999,290 A | 12/1976 | Wood |
| 4,003,301 A | 1/1977 | Norton |
| 4,004,700 A | 1/1977 | Empey |

(56) References Cited

U.S. PATENT DOCUMENTS

| | | | |
|---|---|---|---|
| 4,019,635 A | 4/1977 | Boots | |
| 4,057,153 A | 11/1977 | Weaver | |
| 4,058,239 A | 11/1977 | Van Mill | |
| 4,063,656 A | 12/1977 | Lambert | |
| 4,073,410 A | 2/1978 | Melcher | |
| 4,125,195 A | 11/1978 | Sasadi | |
| 4,138,163 A | 2/1979 | Calvert et al. | |
| 4,178,117 A | 12/1979 | Brugler | |
| 4,204,773 A | 5/1980 | Bates | |
| 4,210,273 A | 7/1980 | Hegele | |
| 4,210,963 A | 7/1980 | Ricciardi et al. | |
| RE30,358 E | 8/1980 | Sensibar | |
| 4,222,498 A | 9/1980 | Brock | |
| 4,227,732 A | 10/1980 | Kish | |
| 4,232,884 A | 11/1980 | DeWitt | |
| 4,239,424 A | 12/1980 | Pavolka | |
| 4,245,820 A | 1/1981 | Muryn | |
| 4,247,228 A | 1/1981 | Gray et al. | |
| 4,247,370 A | 1/1981 | Nijhawan et al. | |
| 4,258,953 A | 3/1981 | Johnson | |
| 4,265,266 A | 5/1981 | Kierbow et al. | |
| 4,278,190 A | 7/1981 | Oory et al. | |
| 4,280,640 A | 7/1981 | Daloisio | |
| 4,282,988 A | 8/1981 | Hulbert, Jr. | |
| 4,287,921 A | 9/1981 | Sanford | |
| 4,287,997 A | 9/1981 | Rolfe et al. | |
| 4,289,353 A | 9/1981 | Merritt | |
| 4,299,597 A | 11/1981 | Oetiker et al. | |
| 4,306,895 A | 12/1981 | Thompson et al. | |
| 4,329,106 A | 5/1982 | Adler | |
| 4,350,241 A | 9/1982 | Wenzel | |
| 4,359,176 A | 11/1982 | Johnson | |
| 4,363,396 A | 12/1982 | Wolf et al. | |
| 4,395,052 A | 7/1983 | Rash | |
| 4,397,406 A | 8/1983 | Croley | |
| 4,398,653 A | 8/1983 | Daloisio | |
| 4,402,392 A | 9/1983 | Fabian et al. | |
| 4,407,202 A | 10/1983 | McCormick | |
| 4,408,886 A | 10/1983 | Sampson et al. | |
| 4,410,106 A | 10/1983 | Kierbow et al. | |
| 4,420,285 A | 12/1983 | Loyer et al. | |
| 4,427,133 A | 1/1984 | Kierbow et al. | |
| 4,428,504 A | 1/1984 | Bassett et al. | |
| 4,449,861 A | 5/1984 | Saito et al. | |
| 4,453,645 A | 6/1984 | Usui et al. | |
| 4,474,204 A | 10/1984 | West | |
| 4,475,672 A | 10/1984 | Whitehead | |
| 4,478,155 A | 10/1984 | Cena et al. | |
| 4,483,462 A | 11/1984 | Heintz | |
| 4,513,755 A | 4/1985 | Baroni | |
| 4,525,071 A | 6/1985 | Horowitz | |
| 4,526,353 A | 7/1985 | Stomp | |
| 4,532,098 A | 7/1985 | Campbell | |
| 4,534,869 A | 8/1985 | Seibert | |
| 4,552,573 A | 11/1985 | Weis | |
| 4,569,394 A | 2/1986 | Sweatman et al. | |
| 4,570,967 A | 2/1986 | Allnut | |
| 4,571,143 A | 2/1986 | Hellerich | |
| 4,588,605 A | 5/1986 | Frei et al. | |
| 4,608,931 A | 9/1986 | Ruhmann et al. | |
| 4,619,531 A | 10/1986 | Dunstan | |
| 4,624,729 A | 11/1986 | Bresciani et al. | |
| 4,626,155 A | 12/1986 | Hlinsky et al. | |
| 4,626,166 A | 12/1986 | Jolly | |
| 4,628,825 A | 12/1986 | Taylor et al. | |
| 4,639,015 A | 1/1987 | Pitts | |
| 4,648,584 A | 3/1987 | Wamser | |
| 4,660,733 A | 4/1987 | Snyder et al. | |
| 4,701,095 A | 10/1987 | Berryman et al. | |
| 4,714,010 A | 12/1987 | Smart | |
| 4,715,754 A | 12/1987 | Scully | |
| 4,724,976 A | 2/1988 | Lee | |
| 4,738,774 A | 4/1988 | Patrick | |
| 4,741,273 A | 5/1988 | Sherwood | |
| 4,745,952 A * | 5/1988 | French | B60P 7/132 141/1 |
| 4,761,039 A | 8/1988 | Hilaris | |
| 4,779,751 A | 10/1988 | Munroe | |
| 4,798,039 A | 1/1989 | Deglise | |
| 4,801,389 A | 1/1989 | Brannon et al. | |
| 4,819,830 A | 4/1989 | Schultz | |
| 4,836,510 A | 6/1989 | Weber et al. | |
| 4,836,735 A | 6/1989 | Dennehy | |
| 4,848,605 A | 7/1989 | Wise | |
| 4,882,784 A | 11/1989 | Tump | |
| 4,889,219 A | 12/1989 | Key | |
| 4,901,649 A | 2/1990 | Fehrenbach | |
| 4,909,378 A | 3/1990 | Webb | |
| 4,909,556 A | 3/1990 | Koskinen | |
| 4,917,019 A | 4/1990 | Hesch et al. | |
| 4,919,583 A | 4/1990 | Speakman, Jr. | |
| 4,923,358 A | 5/1990 | Van Mill | |
| 4,946,068 A | 8/1990 | Erickson et al. | |
| 4,947,760 A | 8/1990 | Dawson et al. | |
| 4,949,714 A | 8/1990 | Orr | |
| 4,954,975 A | 9/1990 | Kalata | |
| 4,956,821 A * | 9/1990 | Fenelon | B28C 7/067 366/16 |
| 4,964,243 A | 10/1990 | Reiter | |
| 4,975,205 A | 12/1990 | Sloan | |
| 4,975,305 A | 12/1990 | Biginelli | |
| 4,988,115 A | 1/1991 | Steinke | |
| 4,995,522 A | 2/1991 | Barr | |
| 5,004,400 A | 4/1991 | Handke | |
| 5,028,002 A | 7/1991 | Whitford | |
| 5,036,979 A | 8/1991 | Selz | |
| 5,042,538 A | 8/1991 | Wiese | |
| 5,069,352 A | 12/1991 | Harbolt et al. | |
| 5,080,259 A | 1/1992 | Hadley | |
| 5,082,304 A | 1/1992 | Preller | |
| 5,102,281 A | 4/1992 | Handke | |
| 5,102,286 A | 4/1992 | Fenton | |
| 5,105,858 A | 4/1992 | Levinson | |
| 5,131,524 A | 7/1992 | Uehara | |
| 5,167,719 A | 12/1992 | Tamaki | |
| 5,190,182 A | 3/1993 | Copas et al. | |
| 5,195,861 A | 3/1993 | Handke | |
| 5,199,826 A | 4/1993 | Lawrence | |
| 5,201,546 A | 4/1993 | Lindsay | |
| 5,224,635 A | 7/1993 | Wise | |
| 5,253,746 A | 10/1993 | Friesen et al. | |
| 5,253,776 A | 10/1993 | Decroix et al. | |
| 5,265,763 A | 11/1993 | Heinrici et al. | |
| 5,277,014 A | 1/1994 | White | |
| 5,280,883 A | 1/1994 | Ibar | |
| 5,286,158 A | 2/1994 | Zimmerman | |
| 5,286,294 A | 2/1994 | Ebi et al. | |
| 5,290,139 A | 3/1994 | Hedrick | |
| 5,317,783 A | 6/1994 | Williamson | |
| 5,320,046 A | 6/1994 | Hesch | |
| 5,324,097 A | 6/1994 | DeCap | |
| 5,339,996 A | 8/1994 | Dubbert | |
| 5,345,982 A | 9/1994 | Nadeau et al. | |
| 5,358,137 A | 10/1994 | Shuert et al. | |
| 5,373,792 A | 12/1994 | Pileggi et al. | |
| 5,392,946 A | 2/1995 | Holbrook et al. | |
| 5,402,915 A | 4/1995 | Hogan | |
| 5,413,154 A | 5/1995 | Hurst et al. | |
| 5,429,259 A | 7/1995 | Robin | |
| 5,441,321 A | 8/1995 | Karpisek | |
| 5,445,289 A | 8/1995 | Owen | |
| 5,465,829 A | 11/1995 | Kruse | |
| 5,470,175 A | 11/1995 | Jensen et al. | |
| 5,470,176 A | 11/1995 | Corcoran et al. | |
| 5,493,852 A | 2/1996 | Stewart | |
| 5,498,119 A | 3/1996 | Faivre | |
| 5,507,514 A | 4/1996 | Jacques | |
| 5,538,286 A | 7/1996 | Hoff | |
| 5,549,278 A | 8/1996 | Sidler | |
| 5,564,599 A | 10/1996 | Barber et al. | |
| 5,570,743 A | 11/1996 | Padgett et al. | |
| 5,590,976 A | 1/1997 | Kilheffer et al. | |
| 5,601,181 A | 2/1997 | Lindhorst | |

(56) References Cited

U.S. PATENT DOCUMENTS

| | | |
|---|---|---|
| 5,602,761 A | 2/1997 | Spoerre et al. |
| 5,613,446 A | 3/1997 | DiLuigi et al. |
| 5,617,974 A | 4/1997 | Sawyer |
| 5,647,514 A | 7/1997 | Toth et al. |
| RE35,580 E | 8/1997 | Heider et al. |
| 5,667,298 A | 9/1997 | Musil |
| 5,687,881 A | 11/1997 | Rouse et al. |
| 5,690,466 A | 11/1997 | Gaddis et al. |
| 5,697,535 A | 12/1997 | Coleman |
| 5,706,614 A | 1/1998 | Wiley et al. |
| 5,718,555 A | 2/1998 | Swalheim |
| 5,722,552 A | 3/1998 | Olson |
| 5,722,688 A | 3/1998 | Garcia |
| 5,746,258 A | 5/1998 | Huck |
| 5,761,854 A | 6/1998 | Johnson et al. |
| 5,762,222 A | 6/1998 | Liu |
| 5,772,390 A | 6/1998 | Walker |
| 5,782,524 A | 7/1998 | Heider et al. |
| 5,785,421 A | 7/1998 | Milek |
| 5,803,296 A | 9/1998 | Olson |
| 5,806,863 A | 9/1998 | Heger et al. |
| 5,836,480 A | 11/1998 | Epp et al. |
| 5,845,799 A | 12/1998 | Deaton |
| 5,876,172 A | 3/1999 | Di Rosa |
| 5,878,903 A | 3/1999 | Ung |
| 5,906,471 A | 5/1999 | Schwoerer |
| 5,911,337 A | 6/1999 | Bedeker |
| 5,924,829 A | 7/1999 | Hastings |
| 5,927,558 A | 7/1999 | Bruce |
| 5,960,974 A | 10/1999 | Kee |
| 5,971,219 A | 10/1999 | Karpisek |
| 5,993,202 A | 11/1999 | Yamazaki et al. |
| 5,997,099 A | 12/1999 | Collins |
| 6,002,063 A | 12/1999 | Bilak et al. |
| 6,006,918 A | 12/1999 | Hart |
| 6,069,118 A | 5/2000 | Hinkel et al. |
| 6,077,068 A | 6/2000 | Okumura |
| 6,092,974 A | 7/2000 | Roth |
| 6,109,486 A | 8/2000 | Lee |
| 6,120,233 A | 9/2000 | Adam |
| D431,358 S | 10/2000 | Willemsen |
| 6,155,175 A | 12/2000 | Rude et al. |
| 6,186,654 B1 | 2/2001 | Gunteret et al. |
| 6,190,107 B1 | 2/2001 | Lanigan et al. |
| 6,192,985 B1 | 2/2001 | Hinkel et al. |
| 6,196,590 B1 | 3/2001 | Kim |
| 6,205,938 B1 | 3/2001 | Foley et al. |
| 6,210,088 B1 | 4/2001 | Crosby |
| 6,231,284 B1 | 5/2001 | Kordel |
| 6,247,594 B1 | 6/2001 | Garton |
| 6,263,803 B1 | 7/2001 | Dohr et al. |
| 6,269,849 B1 | 8/2001 | Fields |
| 6,273,154 B1 | 8/2001 | Laug |
| 6,283,212 B1 | 9/2001 | Hinkel et al. |
| 6,286,986 B2 | 9/2001 | Grimland |
| 6,296,109 B1 | 10/2001 | Nohl |
| 6,306,800 B1 | 10/2001 | Samuel et al. |
| 6,328,156 B1 | 12/2001 | Otsman |
| 6,328,183 B1 | 12/2001 | Coleman |
| 6,364,584 B1 | 4/2002 | Taylor |
| 6,374,915 B1 | 4/2002 | Andrews |
| 6,382,446 B1 | 5/2002 | Hinkle et al. |
| 6,390,742 B1 | 5/2002 | Breeden |
| 6,401,983 B1 | 6/2002 | McDonald et al. |
| 6,412,422 B2 | 7/2002 | Dohr et al. |
| 6,415,909 B1 | 7/2002 | Mitchell et al. |
| 6,416,271 B1 | 7/2002 | Pigott et al. |
| 6,422,413 B1 | 7/2002 | Hall et al. |
| 6,425,725 B1 | 7/2002 | Ehlers |
| 6,450,522 B1 | 9/2002 | Yamada et al. |
| 6,457,291 B2 | 10/2002 | Wick |
| 6,498,976 B1 | 12/2002 | Ehlbeck et al. |
| 6,505,760 B1 | 1/2003 | Werner |
| 6,508,387 B1 | 1/2003 | Simon et al. |
| 6,508,615 B2 | 1/2003 | Taylor |
| 6,523,482 B2 | 2/2003 | Wingate |
| 6,537,002 B2 | 3/2003 | Gloystein |
| 6,557,896 B1 | 5/2003 | Stobart |
| 6,575,614 B2 | 6/2003 | Tosco et al. |
| 6,660,693 B2 | 12/2003 | Miller et al. |
| 6,663,373 B2 | 12/2003 | Yoshida |
| 6,666,573 B2 | 12/2003 | Grassi |
| 6,675,066 B2 | 1/2004 | Moshgbar |
| 6,675,073 B2 | 1/2004 | Kieman et al. |
| 6,705,449 B2 | 3/2004 | Wagstaffe |
| 6,720,290 B2 | 4/2004 | England et al. |
| 6,772,912 B1 | 8/2004 | Schall et al. |
| 6,774,318 B2 | 8/2004 | Beal et al. |
| 6,776,235 B1 | 8/2004 | England |
| 6,783,032 B2 | 8/2004 | Fons |
| 6,811,048 B2 | 11/2004 | Lau |
| 6,828,280 B2 | 12/2004 | England et al. |
| 6,835,041 B1 | 12/2004 | Albert |
| 6,882,960 B2 | 4/2005 | Miller |
| 6,902,061 B1 | 6/2005 | Elstone |
| 6,915,854 B2 | 7/2005 | England et al. |
| 6,953,119 B1 | 10/2005 | Wening |
| 6,955,127 B2 | 10/2005 | Taylor |
| 6,964,551 B1 | 11/2005 | Friesen |
| 6,968,946 B2 | 11/2005 | Shuert |
| 6,974,021 B1 | 12/2005 | Boevers |
| 7,008,163 B2 | 3/2006 | Russell |
| 7,051,661 B2 | 5/2006 | Herzog et al. |
| 7,084,095 B2 | 8/2006 | Lee et al. |
| 7,104,425 B2 | 9/2006 | Le Roy |
| 7,140,516 B2 | 11/2006 | Bothor |
| 7,146,914 B2 | 12/2006 | Morton et al. |
| 7,201,290 B2 | 4/2007 | Mehus et al. |
| 7,214,028 B2 | 5/2007 | Boasso |
| 7,240,681 B2 | 7/2007 | Salk |
| 7,252,309 B2 | 8/2007 | Eng Soon et al. |
| 7,284,579 B2 | 10/2007 | Elgan et al. |
| 7,284,670 B2 | 10/2007 | Schmid |
| 7,316,333 B2 | 1/2008 | Wegner |
| 7,367,271 B2 | 5/2008 | Early |
| 7,377,219 B2 | 5/2008 | Brandt |
| 7,410,623 B2 | 8/2008 | Mehus et al. |
| 7,475,796 B2 | 1/2009 | Garton |
| 7,500,817 B2 | 3/2009 | Furrer et al. |
| 7,513,280 B2 | 4/2009 | Brashears et al. |
| 7,591,386 B2 | 9/2009 | Hooper |
| 7,640,075 B2 | 12/2009 | Wietgrefe |
| 7,695,538 B2 | 4/2010 | Cheng |
| 7,753,637 B2 | 7/2010 | Benedict et al. |
| 7,798,558 B2 | 9/2010 | Messier |
| 7,802,958 B2 | 9/2010 | Garcia et al. |
| 7,803,321 B2 | 9/2010 | Lark et al. |
| 7,837,427 B2 | 11/2010 | Beckel |
| 7,841,394 B2 | 11/2010 | McNeel et al. |
| 7,845,516 B2 | 12/2010 | Pessin et al. |
| 7,858,888 B2 | 12/2010 | Lucas et al. |
| 7,867,613 B2 | 1/2011 | Smith |
| 7,891,304 B2 | 2/2011 | Herzog et al. |
| 7,891,523 B2 | 2/2011 | Mehus et al. |
| 7,896,198 B2 | 3/2011 | Mehus et al. |
| 7,921,783 B2 | 4/2011 | Forbes et al. |
| 7,967,161 B2 | 6/2011 | Townsend |
| 7,980,803 B2 | 7/2011 | Brandstätter et al. |
| 7,997,213 B1 | 8/2011 | Gauthier et al. |
| 7,997,623 B2 | 8/2011 | Williams |
| 8,083,083 B1 | 12/2011 | Mohns |
| 8,201,520 B2 | 6/2012 | Meritt |
| 8,313,278 B2 | 11/2012 | Simmons et al. |
| 8,366,349 B2 | 2/2013 | Beachner |
| 8,375,690 B2 | 2/2013 | LaFargue et al. |
| 8,379,927 B2 | 2/2013 | Taylor |
| 8,387,824 B2 | 3/2013 | Wietgrefe |
| 8,393,502 B2 | 3/2013 | Renyer et al. |
| 8,424,666 B2 | 4/2013 | Berning et al. |
| 8,469,065 B2 | 6/2013 | Schroeder et al. |
| D688,351 S | 8/2013 | Oren |
| 8,505,780 B2 | 8/2013 | Oren |
| 8,544,419 B1 | 10/2013 | Spalding et al. |
| 8,545,148 B2 | 10/2013 | Wanek-Pusset et al. |

(56) References Cited

U.S. PATENT DOCUMENTS

| | | |
|---|---|---|
| 8,562,022 B2 | 10/2013 | Nadeau et al. |
| 8,573,387 B2 | 11/2013 | Trimble |
| 8,573,917 B2 | 11/2013 | Renyer |
| 8,585,341 B1 | 11/2013 | Oren |
| D694,670 S | 12/2013 | Oren |
| 8,616,370 B2 | 12/2013 | Allegretti |
| 8,622,251 B2 | 1/2014 | Oren |
| 8,636,832 B2 | 1/2014 | Stutzman et al. |
| 8,646,641 B2 | 2/2014 | Moir |
| 8,662,525 B1 | 3/2014 | Dierks et al. |
| 8,668,430 B2 | 3/2014 | Oren |
| D703,582 S | 4/2014 | Oren |
| 8,820,559 B2 | 9/2014 | Beitler et al. |
| 8,827,118 B2 | 9/2014 | Oren |
| 8,881,749 B1 | 11/2014 | Smith |
| 8,887,914 B2 | 11/2014 | Allegretti |
| 8,905,266 B2 | 12/2014 | De Brabanter |
| 8,915,691 B2 | 12/2014 | Mintz |
| 9,051,801 B1 | 6/2015 | Mintz |
| 9,052,034 B1 | 6/2015 | Wegner et al. |
| D740,556 S | 10/2015 | Huber |
| 9,162,261 B1 | 10/2015 | Smith |
| 9,267,266 B2 | 2/2016 | Cutler et al. |
| 9,296,572 B2 | 3/2016 | Houghton et al. |
| 9,309,064 B2 | 4/2016 | Sheesley |
| 9,410,414 B2 | 8/2016 | Tudor |
| D780,883 S | 3/2017 | Schaffner et al. |
| D783,771 S | 4/2017 | Stegemoeller et al. |
| D783,772 S | 4/2017 | Stegemoeller, III et al. |
| 9,624,036 B2 | 4/2017 | Luharuka et al. |
| 9,688,492 B2 | 6/2017 | Stutzman et al. |
| 9,796,318 B1 | 10/2017 | Nolasco |
| 2001/0022308 A1 | 9/2001 | Epp et al. |
| 2001/0038777 A1 | 11/2001 | Cassell |
| 2001/0045338 A1 | 11/2001 | Ransil et al. |
| 2002/0134550 A1 | 9/2002 | Leeson et al. |
| 2002/0139643 A1 | 10/2002 | Peltier et al. |
| 2003/0006248 A1 | 1/2003 | Gill et al. |
| 2003/0024971 A1 | 2/2003 | Jones |
| 2003/0111470 A1 | 6/2003 | Fouillet et al. |
| 2003/0145418 A1 | 8/2003 | Ikeda et al. |
| 2003/0156929 A1 | 8/2003 | Russell |
| 2004/0065699 A1 | 4/2004 | Schoer et al. |
| 2004/0074922 A1 | 4/2004 | Bother et al. |
| 2004/0084874 A1 | 5/2004 | McDougall et al. |
| 2004/0206646 A1 | 10/2004 | Goh |
| 2004/0245284 A1 | 12/2004 | Mehus et al. |
| 2005/0158158 A1 | 7/2005 | Porta |
| 2005/0201851 A1 | 9/2005 | Jonkka |
| 2006/0012183 A1 | 1/2006 | Marchiori et al. |
| 2006/0027582 A1 | 2/2006 | Beach |
| 2006/0053582 A1 | 3/2006 | Engel et al. |
| 2006/0091072 A1 | 5/2006 | Schmid et al. |
| 2006/0151058 A1 | 7/2006 | Salaoras et al. |
| 2006/0180062 A1 | 8/2006 | Furrer et al. |
| 2006/0180232 A1 | 8/2006 | Glewwe et al. |
| 2006/0239806 A1 | 10/2006 | Yelton |
| 2006/0267377 A1 | 11/2006 | Lusk et al. |
| 2006/0277783 A1 | 12/2006 | Garton |
| 2006/0289166 A1 | 12/2006 | Stromquist et al. |
| 2007/0096537 A1 | 5/2007 | Hicks |
| 2007/0125543 A1 | 6/2007 | McNeel et al. |
| 2007/0194564 A1 | 8/2007 | Garceau et al. |
| 2008/0008562 A1 | 1/2008 | Beckel et al. |
| 2008/0029546 A1 | 2/2008 | Shuld |
| 2008/0029553 A1 | 2/2008 | Culleton |
| 2008/0058228 A1 | 3/2008 | Wilson |
| 2008/0179054 A1 | 7/2008 | McGough et al. |
| 2008/0179324 A1 | 7/2008 | McGough et al. |
| 2008/0213073 A1 | 9/2008 | Benedict et al. |
| 2008/0226434 A1 | 9/2008 | Smith et al. |
| 2008/0264641 A1 | 10/2008 | Slabaugh et al. |
| 2008/0277423 A1 | 11/2008 | Garton |
| 2008/0315558 A1 | 12/2008 | Cesterino |
| 2009/0038242 A1 | 2/2009 | Cope |
| 2009/0078410 A1 | 3/2009 | Krenek et al. |
| 2009/0223143 A1 | 9/2009 | Esposito |
| 2009/0278326 A1 | 11/2009 | Rowland et al. |
| 2010/0021258 A1 | 1/2010 | Kim |
| 2010/0037572 A1 | 2/2010 | Cheng |
| 2010/0038143 A1 | 2/2010 | Burnett et al. |
| 2010/0040446 A1 | 2/2010 | Renyer |
| 2010/0065466 A1 | 3/2010 | Perkins |
| 2010/0072308 A1 | 3/2010 | Hermann et al. |
| 2010/0080681 A1 | 4/2010 | Bain |
| 2010/0108711 A1 | 5/2010 | Wietgrefe |
| 2010/0129193 A1 | 5/2010 | Sheffer |
| 2010/0199668 A1 | 8/2010 | Coustou et al. |
| 2010/0207371 A1 | 8/2010 | Van Houdt et al. |
| 2010/0278621 A1 | 11/2010 | Redekop |
| 2010/0288603 A1 | 11/2010 | Schafer |
| 2010/0320727 A1 | 12/2010 | Haut et al. |
| 2011/0011893 A1 | 1/2011 | Cerny |
| 2011/0017693 A1 | 1/2011 | Thomas |
| 2011/0101040 A1 | 5/2011 | Weissbrod |
| 2011/0109073 A1 | 5/2011 | Williams |
| 2011/0121003 A1 | 5/2011 | Moir |
| 2011/0127178 A1 | 6/2011 | Claussen |
| 2011/0160104 A1 | 6/2011 | Wu et al. |
| 2011/0162838 A1 | 7/2011 | Mackenzie et al. |
| 2011/0168593 A1 | 7/2011 | Neufeld et al. |
| 2011/0222983 A1 | 9/2011 | Dugic et al. |
| 2011/0297702 A1 | 12/2011 | Hildebrandt et al. |
| 2012/0017812 A1 | 1/2012 | Renyer |
| 2012/0090956 A1 | 4/2012 | Brobst |
| 2012/0103848 A1 | 5/2012 | Allegretti et al. |
| 2012/0219391 A1 | 8/2012 | Teichrob et al. |
| 2012/0247335 A1 | 10/2012 | Stutzman et al. |
| 2012/0255539 A1 | 10/2012 | Kolecki |
| 2013/0004272 A1 | 1/2013 | Mintz |
| 2013/0022441 A1 | 1/2013 | Uhryn et al. |
| 2013/0206415 A1 | 8/2013 | Sheesley |
| 2013/0209204 A1 | 8/2013 | Sheesley |
| 2013/0233545 A1 | 9/2013 | Mahoney |
| 2013/0284729 A1 | 10/2013 | Cook et al. |
| 2013/0309052 A1 | 11/2013 | Luharuka |
| 2013/0323005 A1 | 12/2013 | Rexius et al. |
| 2014/0020765 A1 | 1/2014 | Oren |
| 2014/0020892 A1 | 1/2014 | Oren |
| 2014/0023465 A1 | 1/2014 | Oren et al. |
| 2014/0034662 A1 | 2/2014 | Chalmers et al. |
| 2014/0044507 A1 | 2/2014 | Naizer et al. |
| 2014/0077484 A1 | 3/2014 | Harrell |
| 2014/0083554 A1 | 3/2014 | Harris |
| 2014/0093319 A1 | 4/2014 | Harris et al. |
| 2014/0097182 A1 | 4/2014 | Sheesley |
| 2014/0166647 A1 | 6/2014 | Sheesley |
| 2014/0202590 A1 | 7/2014 | Higgins |
| 2014/0203046 A1 | 7/2014 | Allegretti |
| 2014/0234059 A1 | 8/2014 | Thomeer |
| 2014/0305769 A1 | 10/2014 | Eiden et al. |
| 2014/0321950 A1 | 10/2014 | Krenek et al. |
| 2014/0377042 A1 | 12/2014 | McMahon |
| 2015/0004895 A1 | 1/2015 | Hammers et al. |
| 2015/0069052 A1 | 3/2015 | Allegretti et al. |
| 2015/0079890 A1 | 3/2015 | Stutzman et al. |
| 2015/0086307 A1 | 3/2015 | Stefan |
| 2015/0086308 A1 | 3/2015 | McIver et al. |
| 2015/0107822 A1 | 4/2015 | Tudor |
| 2015/0110565 A1 | 4/2015 | Harris |
| 2015/0115589 A1 | 4/2015 | Thiessen |
| 2015/0159232 A1 | 6/2015 | Zucchi et al. |
| 2015/0209829 A1 | 7/2015 | De Siqueira et al. |
| 2015/0284183 A1 | 10/2015 | Houghton et al. |
| 2016/0148813 A1 | 5/2016 | Rogers et al. |
| 2016/0177678 A1 | 6/2016 | Morris et al. |
| 2016/0185522 A1 | 6/2016 | Herman et al. |
| 2016/0273355 A1 | 9/2016 | Gosney et al. |
| 2016/0280480 A1 | 9/2016 | Smith et al. |
| 2017/0129721 A1 | 5/2017 | Harris et al. |

(56) References Cited

U.S. PATENT DOCUMENTS

| | | |
|---|---|---|
| 2017/0217353 A1 | 8/2017 | Vander Pol |
| 2018/0009401 A1 | 1/2018 | Miller et al. |

FOREIGN PATENT DOCUMENTS

| | | |
|---|---|---|
| CN | 2037354 | 5/1989 |
| CN | 2059909 | 8/1990 |
| CN | 2075632 | 4/1991 |
| CN | 1329562 | 1/2002 |
| CN | 2517684 | 10/2002 |
| CN | 1635965 | 7/2005 |
| CN | 2913250 | 6/2007 |
| CN | 201161588 | 12/2008 |
| CN | 201390486 | 1/2010 |
| CN | 101823630 | 9/2010 |
| CN | 102101595 | 6/2011 |
| CN | 201881469 | 6/2011 |
| CN | 102114985 | 7/2011 |
| CN | 203033469 | 7/2013 |
| CN | 103350017 | 10/2013 |
| CN | 203580948 | 5/2014 |
| DE | 3108121 | 9/1982 |
| DE | 3342281 | 6/1985 |
| DE | 4008147 | 9/1990 |
| DE | 4217329 | 5/1993 |
| DE | 20317967 | 3/2004 |
| EP | 0016977 | 10/1980 |
| EP | 0019967 | 12/1980 |
| EP | 322283 | 6/1989 |
| EP | 0564969 | 10/1993 |
| EP | 0997607 | 5/2000 |
| EP | 1052194 | 11/2000 |
| EP | 1167236 | 1/2002 |
| EP | 1598288 | 11/2005 |
| EP | 1775190 | 4/2007 |
| EP | 1795467 | 6/2007 |
| EP | 2062832 | 5/2009 |
| EP | 2311757 | 4/2011 |
| FR | 2173445 | 10/1973 |
| FR | 2640598 | 6/1990 |
| GB | 1000621 | 8/1965 |
| GB | 1296736 | 11/1972 |
| GB | 1333976 | 10/1973 |
| GB | 2066220 | 7/1981 |
| GB | 2204847 | 11/1988 |
| GB | 2374864 | 10/2002 |
| JP | S4871029 | 9/1973 |
| JP | S4876041 | 9/1973 |
| JP | S58161888 | 10/1983 |
| JP | 410087046 | 4/1998 |
| JP | 10264882 | 10/1998 |
| JP | 11034729 | 2/1999 |
| JP | 2007084151 | 4/2007 |
| MX | 2012011046 | 5/2013 |
| NL | 8105283 | 6/1983 |
| WO | 1990008082 | 7/1990 |
| WO | 1992002437 | 2/1992 |
| WO | 1993001997 | 2/1993 |
| WO | 1993006031 | 4/1993 |
| WO | 1996025302 | 8/1996 |
| WO | 2003024815 | 3/2003 |
| WO | 2006039757 | 4/2006 |
| WO | 2007005054 | 1/2007 |
| WO | 2007057398 | 5/2007 |
| WO | 2007061310 | 5/2007 |
| WO | 2008012513 | 1/2008 |
| WO | 2009087338 | 7/2009 |
| WO | 2010026235 | 3/2010 |
| WO | 2011099358 | 8/2011 |
| WO | 2012021447 | 2/2012 |
| WO | 2012058059 | 5/2012 |

OTHER PUBLICATIONS

Non-Final Office Action dated Apr. 3, 2017 for co-pending U.S. Appl. No. 13/555,635.
Non-Final Office Action dated Feb. 14, 2017 for co-pending U.S. Appl. No. 14/943,111.
Final Office Action dated Mar. 7, 2017 for co-pending U.S. Appl. No. 15/144,296.
Non-Final Office Action dated Apr. 6, 2017 for co-pending U.S. Appl. No. 13/768,962.
Non-Final Office Action dated Mar. 6, 2017 for co-pending U.S. Appl. No. 15/152,744.
Non-Final Office Action dated Feb. 24, 2017 for co-pending U.S. Appl. No. 14/943,182.
Non-Final Office Action dated May 13, 2016 for co-pending U.S. Appl. No. 14/986,826.
Final Office Action dated Sep. 15, 2016 for co-pending U.S. Appl. No. 14/922,836.
Non-Final Office Action dated Feb. 4, 2016 for co-pending U.S. Appl. No. 14/922,836.
Final Office Action dated Aug. 25, 2016 for co-pending U.S. Appl. No. 14/927,614.
Non-Final Office Action dated Mar. 1, 2016 for co-pending U.S. Appl. No. 14/927,614.
Non-Final Office Action dated Apr. 29, 2016 for co-pending U.S. Appl. No. 14/943,182.
Final Office Action dated Sep. 15, 2016 for co-pending U.S. Appl. No. 14/882,973.
Non-Final Office Action dated Feb. 11, 2016 for co-pending U.S. Appl. No. 14/882,973.
Non-Final Office Action dated Aug. 11, 2016 for co-pending U.S. Appl. No. 13/625,675.
Final Office Action dated Nov. 11, 2015 for co-pending U.S. Appl. No. 13/625,675.
Non-Final Office Action dated Mar. 11, 2015 for co-pending U.S. Appl. No. 13/625,675.
Non-Final Office Action dated Dec. 28, 2016 for co-pending U.S. Appl. No. 13/628,702.
Non-Final Office Action dated Jan. 13, 2017 for co-pending U.S. Appl. No. 14/923,920.
Final Office Action dated Jan. 12, 2017 for co-pending U.S. Appl. No. 14/841,942.
Non-Final Office Action dated Dec. 23, 2016 for co-pending U.S. Appl. No. 14/485,686.
Non-Final Office Action dated Jan. 27, 2017 for co-pending U.S. Appl. No. 14/485,687.
Non-Final Office Action dated Dec. 20, 2016 for co-pending U.S. Appl. No. 14/831,924.
Final Office Action dated Jan. 19, 2017 for co-pending U.S. Appl. No. 13/660,855.
Final Office Action dated Nov. 25, 2016 for co-pending U.S. Appl. No. 15/152,744.
Non-Final Office Action dated Dec. 15, 2016 for co-pending U.S. Appl. No. 14/848,447.
Non-Final Office Action dated Dec. 9, 2016 for co-pending U.S. Appl. No. 14/927,614.
Frac Sand Primer by Brian D. Olmen, Kelrick, LLC, from Hydraulic Fracturing by Michael Berry Smith and Carl Montgomery (CRC Press, Dec. 16, 2015), p. 384.
Premier Silica LLC, Sands Application in the Energy Market, Irving, TX, Copyright 2016.
Getty, John, Montana Tech; ASTM International, Overview of Proppants and Existing Standards and Practices, Jacksonville, FL, Jan. 29, 2013.
Arrows Up, Inc., Jumbo BTS—Bulk Transport System, Aug. 1, 2014.
Arrows Up, Inc., Reusable Packaging Association, Member Spotlight: John Allegrelli, President & CEO, Arrows Up, Inc., Jun. 23, 2016.
Seed Today, Arrows Up, Inc. Bulk Transport System (BTS), Country Journal Publishing Co., Decatur, IL, Mar. 2, 2011.
SeedQuest, Arrows Up, Inc. launches innovative bulk transport system for see, Barrington, IL, Mar. 2, 2011.

(56) References Cited

OTHER PUBLICATIONS

Monster Tanks, Inc., Sand Monster Website, http://monstertanksinc.com/sandmonster.html, 2012.
Solaris Oilfield Infrastructure, Mobile Sand Silo System, 2016.
Final Office Action dated Sep. 27, 2016 for co-pending U.S. Appl. No. 13/555,635.
Non-Final Office Action dated Mar. 23, 2016 for co-pending U.S. Appl. No. 13/555,635.
Final Office Action dated Jul. 30, 2015 for co-pending U.S. Appl. No. 13/555,635.
Non-Final Office Action dated Oct. 22, 2014 for co-pending U.S. Appl. No. 13/555,635.
Final Office Action dated Jun. 21, 2016 for co-pending U.S. Appl. No. 13/628,702.
Non-Final Office Action dated Feb. 23, 2016 for co-pending U.S. Appl. No. 13/628,702.
Final Office Action dated Sep. 22, 2015 for co-pending U.S. Appl. No. 13/628,702.
Non-Final Office Action dated Jul. 28, 2015 for co-pending U.S. Appl. No. 13/628,702.
Final Office Action dated Mar. 24, 2015 for co-pending U.S. Appl. No. 13/628,702.
Non-Final Office Action dated Sep. 18, 2014 for co-pending U.S. Appl. No. 13/628,702.
Final Office Action dated Jun. 27, 2016 for co-pending U.S. Appl. No. 14/831,924.
Non-Final Office Action dated Feb. 16, 2016 for co-pending U.S. Appl. No. 14/831,924.
Final Office Action dated Jun. 27, 2016 for co-pending U.S. Appl. No. 14/923,920.
Non-Final Office Action dated Feb. 9, 2016 for co-pending U.S. Appl. No. 14/923,920.
Final Office Action dated Sep. 15, 2016 for co-pending U.S. Appl. No. 14/943,111.
Non-Final Office Action dated Apr. 5, 2016 for co-pending U.S. Appl. No. 14/943,111.
Final Office Action dated Jul. 18, 2016 for co-pending U.S. Appl. No. 14/948,494.
Non-Final Office Action dated Apr. 8, 2016 for co-pending U.S. Appl. No. 14/948,494.
Non-Final Office Action dated Sep. 6, 2016 for co-pending U.S. Appl. No. 15/144,296.
Non-Final Office Action dated Jul. 25, 2016 for co-pending U.S. Appl. No. 13/660,855.
Final Office Action dated Apr. 28, 2016 for co-pending U.S. Appl. No. 13/660,855.
Non-Final Office Action dated Oct. 6, 2015 for co-pending U.S. Appl. No. 13/660,855.
Final Office Action dated Aug. 6, 2015 for co-pending U.S. Appl. No. 13/660,855.
Non-Final Office Action dated Apr. 29, 2015 for co-pending U.S. Appl. No. 13/660,855.
Final Office Action dated Dec. 17, 2014 for co-pending U.S. Appl. No. 13/660,855.
Non-Final Office Action dated Sep. 4, 2014 for co-pending U.S. Appl. No. 13/660,855.
Final Office Action dated Sep. 24, 2013 for co-pending U.S. Appl. No. 13/660,855.
Non-Final Office Action dated May 14, 2013 for co-pending U.S. Appl. No. 13/660,855.
Non-Final Office Action dated Jul. 5, 2016 for co-pending U.S. Appl. No. 14/996,362.
Non-Final Office Action dated Jul. 6, 2016 for co-pending U.S. Appl. No. 15/144,450.
Final Office Action dated Sep. 29, 2016 for co-pending U.S. Appl. No. 13/768,962.
Non-Final Office Action dated Apr. 5, 2016 for co-pending U.S. Appl. No. 13/768,962.
Final Office Action dated Oct. 9, 2015 for co-pending U.S. Appl. No. 13/768,962.
Non-Final Office Action dated May 1, 2015 for co-pending U.S. Appl. No. 13/768,962.
Non-Final Office Action dated Jul. 18, 2016 for co-pending U.S. Appl. No. 15/152,744.
Non-Final Office Action dated Apr. 13, 2016 for co-pending U.S. Appl. No. 14/738,485.
Non-Final Office Action dated Sep. 7, 2016 for co-pending U.S. Appl. No. 14/841,942.
Final Office Action dated May 12, 2016 for co-pending U.S. Appl. No. 14/841,942.
Non-Final Office Action dated Nov. 30, 2015 for co-pending U.S. Appl. No. 14/841,942.
Non-Final Office Action dated Jul. 21, 2016 for co-pending U.S. Appl. No. 15/083,596.
Non-Final Office Action dated Aug. 19, 2016 for co-pending U.S. Appl. No. 15/084,613.
Non-Final Office Action dated Sep. 6, 2016 for co-pending U.S. Appl. No. 15/143,942.
Final Office Action dated Sep. 1, 2016 for co-pending U.S. Appl. No. 14/848,447.
Non-Final Office Action dated Apr. 8, 2016 for co-pending U.S. Appl. No. 14/848,447.
Non-Final Office Action dated Oct. 27, 2016 for co-pending U.S. Appl. No. 15/219,676.
Non-Final Office Action dated Nov. 9, 2016 for co-pending U.S. Appl. No. 14/948,494.
Final Office Action dated Nov. 4, 2016 for co-pending U.S. Appl. No. 14/738,485.
Final Office Action dated Oct. 13, 2017 for co-pending U.S. Appl. No. 15/398,950.
Non-Final Office Action dated Sep. 21, 2017 for co-pending U.S. Appl. No. 15/413,822.
Non-Final Office Action dated Oct. 5, 2017 for co-pending U.S. Appl. No. 14/848,447.
Final Office Action dated Sep. 21, 2017 for co-pending U.S. Appl. No. 14/922,836.
Non-Final Office Action dated Sep. 27, 2017 for co-pending U.S. Appl. No. 14/996,362.
Non-Final Office Action dated Sep. 28, 2017 for co-pending U.S. Appl. No. 13/628,702.
Final Office Action dated Jan. 22, 2018 for co-pending U.S. Appl. No. 13/628,702.
Final Office Action dated Jan. 25, 2018 for co-pending U.S. Appl. No. 15/602,666.
Final Office Action dated Feb. 6, 2018 for co-pending U.S. Appl. No. 15/475,354.
Non-Final Office Action dated Feb. 9, 2018 for co-pending U.S. Appl. No. 15/587,926.
Non-Final Office Action dated Feb. 15, 2018 for co-pending U.S. Appl. No. 14/922,836.
Final Office Action dated Dec. 27, 2017 for co-pending U.S. Appl. No. 14/943,182.
International Search Report and Written Opinion for PCT/US2017/012271, dated May 22, 2017.
Non-Final Office Action dated Apr. 24, 2017 for co-pending U.S. Appl. No. 14/738,485.
Final Office Action dated May 4, 2017 for co-pending U.S. Appl. No. 15/143,942.
Final Office Action dated May 30, 2017 for co-pending U.S. Appl. No. 13/625,675.
Non-Final Office Action dated May 10, 2017 for co-pending U.S. Appl. No. 14/882,973.
Final Office Action dated May 2, 2017 for co-pending U.S. Appl. No. 15/219,676.
Non-Final Office Action dated Jul. 26, 2017 for co-pending U.S. Appl. No. 15/463,201.
Final Office Action dated Jul. 27, 2017 for co-pending U.S. Appl. No. 14/738,485.
Non-Final Office Action dated Aug. 3, 2017 for co-pending U.S. Appl. No. 15/219,676.
Beckwith, Robin, Proppants: Where in the World, Proppant Shortage, JPT, Apr. 2011 (6 pages).

(56) References Cited

OTHER PUBLICATIONS

Kullman, John, The Complicated World of Proppant Selection . . . , South Dakota School of Mines & Technology, Oct. 2011 (65 pages).
Lafollette, Randy, Key Considerations for Hydraulic Fracturing of Gas Shales, BJ Services Company, Sep. 9, 2010 (53 pages).
WW Trailers Inc., Model GN2040EZ datasheet, Portland, OR, Jan. 2007 (4pages).
WW Trailers Inc., Model GN204S9A datasheet, Portland, OR, Jan. 2007 (4pages).
Smith, Ryan E., Prefab Architecture, A Guide to Modular Design and Construction, John Wiley & Sons, Inc., 2010.
OSHA-NIOSH, Hazard Alert: Worker Exposure to Silica during Hydraulic Fracturing, Jun. 2012.
Tremoglie, Michael P., Legal NewsLine, OSHA, NIOSH issue Tracking health alert (/stories/510527440-oshaniosh-issue-fracking-health-alert), Jun. 25, 2012.
Beckwith, Robin, Proppants: Where in the World, Journal of Petroleum Technology, Apr. 2011.
Final Office Action dated Feb. 27, 2018 for co-pending U.S. Appl. No. 15/143,942.
ISO 1496-1: International Standard, Series 1 Freight Containers—Specification and Testing—Part 1, General Cargo Containers, Fifth Edition, Aug. 15, 1990.
ISO 6346: International Standard, Freight Containers—Coding, Identification and Marking, Third Edition, Dec. 1, 1995.
ISO/IEC 15416: International Standard, Information Technology—Automatic Identification and Data Capture Techniques—Bar Code Print Quality Test Specification—Linear Symbols, First Edition, Aug. 15, 2000.
Hoel, Lester A., Giuliano, Genevieve and Meyer, Michael D., Portions of Intermodal Transportation: Moving Freight in a Global Economy, Copyright Eno Transportation Foundation, 2011.
Non-Final Office Action dated Apr. 26, 2018 for co-pending U.S. Appl. No. 15/616,783.
Final Office Action dated Apr. 23, 2018 for co-pending U.S. Appl. No. 14/848,447.
Final Office Action dated Mar. 16, 2018 for co-pending U.S. Appl. No. 14/996,362.
Final Office Action dated Mar. 14, 2018 for co-pending U.S. Appl. No. 15/144,450.
International Organization for Standardization, ISO 668:1995(E).
International Organization for Standardization, ISO 668:1995(E)/Amd.1:2005(E).
International Organization for Standardization, ISO 668:1995(E)/Amd.2:2005(E).
International Organization for Standardization, ISO 1496-1:1990/Amd.1:1993(E).
International Organization for Standardization, ISO 1496-1:1990/Amd.2:1998(E).
International Organization for Standardization, ISO 1496-1:1990/Amd.3:2005(E).
International Organization for Standardization, ISO 1496-1:1990/Amd.4:2006(E).
International Organization for Standardization, ISO 1496-1:1990/Amd.5:2006(E).
Rastikian, K. et al., Modelling of sugar drying in a countercurrent cascading rotary dryer from stationary profiles of temperature and moisture, Journal of Food Engineering 41 (1999).
Final Office Action dated Jun. 1, 2017 for co-pending U.S. Appl. No. 13/628,702.
Final Office Action dated Jul. 3, 2017 for co-pending U.S. Appl. No. 14/923,920.
Non-Final Office Action dated Jun. 28, 2017 for co-pending U.S. Appl. No. 15/589,185.
Final Office Action dated Jun. 7, 2017 for co-pending U.S. Appl. No. 14/848,447.
Final Office Action dated Jun. 28, 2017 for co-pending U.S. Appl. No. 14/485,687.
Final Office Action dated Jun. 6, 2017 for co-pending U.S. Appl. No. 14/927,614.
Final Office Action dated Jun. 21, 2017 for co-pending U.S. Appl. No. 14/943,182.
Yergin, Daniel, The Quest: Energy, Security, and the Remaking of the Modern World, 2011.
Gold, Russell, The Boom: How Fracking Ignited the American Energy Revolution and Changed the World, 2014.
Yergin, Daniel, Stepping on the Gas, Wall Street Journal, Apr. 2, 2011.
Raimi, Daniel et al., Dunn County and Watford City, North Dakota: A case study of the fiscal effects of Bakken shale development, Duke University Energy Initiative, May 2016.
Local Economic Impacts Related to Marcellus Shale Development, The Center for Rural Pennyslvania, Sep. 2014.
Eagle Ford Shale Task Force Report, Railroad Commission of Texas, Convened and Chaired by David Porter, Mar. 2013.
*Sandbox Logistics LLC et al v. Grit Energy Solutions LLC*, 3:16-cv-00012, 73.Parties' P.R. 4-3 Joint Claim Construction and Prehearing Statement by Oren Technologies LLC, SandBox Enterprises LLC, SandBox Logistics LLC, Nov. 17, 2016.
Beard, Tim, Fracture Design in Horizontal Shale Wells—Data Gathering to Implementation, EPA Hydraulic Fracturing Workshop, Mar. 10-11, 2011.
Economic Impact of the Eagle Ford Shale, Center for Community and Business Research at the University of Texas at San Antonio's Institute for Economic Development, Sep. 2014.
Kelsey, Timothy W. et al., Economic Impacts of Marcellus Shale in Pennsylvania: Employment and Income in 2009, The Marcellus Shale Education & Training Center, Aug. 2011.
2006 Montana Commercial Vehicle Size and Weight and Safety Trucker's Handbook, Montana Department of Transportation Motor Carrier Services Division, Fifth Edition, Jun. 2010.
Budzynski, Brian W., Never Meant to Take the Weight, Roads & Bridges, Apr. 2015.
Interstate Weight Limits, 23 C.F.R. § 658, Apr. 1, 2011.
VIN Requirements, 49 C.F.R. § 565, Oct. 1, 2011.
Benson, Mary Ellen et al., Frac Sand in the United States—A Geological and Industry Overview, U.S. Department of the Interior, U.S. Geological Survey, 2015-2017.
Beekman, Thomas J. et al., Transportation Impacts of the Wisconsin Fracture Sand Industry, Wisconsin Department of Transportation, Mar. 2013.
U.S. Silica Company, Material Safety Data Sheet, Jan. 2011.
Texas Transportation Code, Chapter 621, General Provisions Relating to Vehicle Size and Weight (Sec. 621.101 effective Sep. 1, 2005 and Section 621.403 effective Sep. 1, 1995).
Garner, Dwight, Visions of an Age When Oil Isn't King, New York Times, Sep. 20, 2011.
Randy Lafollette, Key Considerations for Hydraulic Fracturing of Gas Shales, May 12, 2010.
Case No. 4:17-cv-00589, Plaintiffs' P.R. 3-1 and 3-2 Infringement Contentions and Disclosures, Jun. 8, 2017.
Non-Final Office Action dated Sep. 8, 2017 for co-pending U.S. Appl. No. 15/475,354.
Non-Final Office Action dated Sep. 8, 2017 for co-pending U.S. Appl. No. 15/143,942.
Non-Final Office Action dated Aug. 4, 2017 for co-pending U.S. Appl. No. 13/625,675.
Non-Final Office Action dated Aug. 30, 2017 for co-pending U.S. Appl. No. 14/943,182.
Itsumi Nagahama, English translation of Japan Unexamined Application No. S4871029, Dec. 14, 1971.

* cited by examiner

SYSTEMS AND METHODS FOR BULK MATERIAL STORAGE AND/OR TRANSPORT

CROSS REFERENCE TO RELATED APPLICATIONS

The present application is a divisional which claims priority to and the benefit of U.S. application Ser. No. 13/625,675, filed on Sep. 24, 2012, and titled "SYSTEMS AND METHODS FOR BULK MATERIAL STORAGE AND/OR TRANSPORT," which claims priority to U.S. Provisional Application No. 61/538,616, filed on Sep. 23, 2011, and titled PORTABLE SHIPPING/STORAGE CONTAINER," each of which is incorporated herein by reference in its entirety.

TECHNICAL FIELD

Exemplary embodiments of the present invention relate generally to the handling of bulk materials, and more particularly, to a bulk material container for storage and/or transporting of particulate materials therein.

BACKGROUND OF THE INVENTION

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as any admission of prior art.

Bulk materials, such as sand, coal, ores, or grains, are typically collected (e.g., mined or harvested) at the source, stored, then transported and delivered to end users. The flow of materials between the origin and destination, i.e., logistics, significantly affects the profitably of such materials. Profitability increases with improved logistics.

A frequent problem with shipping bulk materials is bottle necks in the logistics chain. Bottle necks are often caused by transportation delays. Transportation delays can be isolated at the point of the delay by providing excess storage capacity to accommodate any accumulation of material due to the delay. For example, if trucks are not available to transport materials as they arrive by train, the materials collect at the train yard. As long as the train yard has available storage capacity, material continues to be shipped. However, once all excess storage capacity has been used, no further materials can be moved (logistical gridlock).

A significant aspect of shipping bulk materials is the ability to ship and efficiently store the material along the logistics chain. Storage containers for bulk materials are typically large permanently fixed storage vessels often referred to as silos. These are costly and do not facilitate in the transportation process of materials from one site to another. Accordingly, the need exists for a method and apparatus that provide storage solutions that also facilitate the transportation process to expedite the logistics of delivering bulk materials from an origin to the end users.

SUMMARY OF THE INVENTION

In one embodiment, a bulk material storage container unit is described. The container unit includes a storage component that includes a generally rectangular portion and a tapered portion, and a frame component attached to said storage component, where the frame component includes a plurality of support members configured to allow said storage component to sit on a surface. The container unit further includes a dispenser component attached to the storage component, and a top surface attached to the storage component, where the top surface includes at least one opening and a lid member corresponding to the lid member. The bulk material storage container unit also comprises a width that corresponds to the width of at least one of a rail cart trailer and a truck trailer. In one embodiment, the tapered portion includes a plurality of walls disposed at an angle with respect to a horizontal surface, said angle is in the range between about 25 degrees and about 60 degrees. In particular, the angle is about 45 degrees.

The container unit can further include a diverter component attached to the storage component, where the diverter component is configured to reduce the angle of repose of particulates entering the storage component through the at least one opening of the top surface. In one embodiment, the number of diverter components corresponds to the number of opening of the top surface. In another embodiment, each diverter component is placed in said storage component below the respective opening. In one embodiment, the component includes a diverter plate with a plurality of apertures, where the diverter plate being positioned to disperse bulk material entering the bulk material storage container. In one embodiment, the diverter component comprises two surfaces at an angle with respect to said top surface and a plurality of apertures. Some of the plurality of apertures can have a diameter of about 1.5 inches. The angle of said two surfaces with respect to the top surface can be in the range of about 27 degrees to about 89 degrees. In one particular embodiment, the angle is about 30 degrees.

In one embodiment, the bulk material storage container unit has a length of less than about 12 feet, a width of less than about 8 feet 6 inches, and a height of less than about 10 feet. In particular, the length is preferably about 12 feet, said width is about 8 feet 4 inches, and said height is about 9 feet 9 1/16 inches. In one embodiment, the lid member has a width that ranges between about 12 inches and about 48 inches and a length of about 10 feet.

In one embodiment, the plurality of support members include at least one of a plurality of vertical support members, a plurality of horizontal support members, and a plurality of angled support members. In one embodiment, the frame component, storage component, and diverter component comprise at least one of the following materials: aluminum, steel, plastic, or fiberglass. The container unit can include a transfer component, which can enable a forklift to engage and move the bulk material storage container unit. Alternatively or in addition to, the transfer component can also be a lift ring.

In one embodiment, the dispenser component is configured allow for adjustment of the flow rate of particulates from the storage component. In particular, the dispenser component is a butterfly valve.

According to another aspect of the invention, a method for filling a container with particulates is described. In one embodiment, the method comprises the step of pouring a plurality of particulates into a container through at least one opening of the container, where the pouring step forms a flow of particulates into the container. The method further includes the step of reducing the angle of repose of the particulates in the container by diverting at least a portion of the particulates from the flow of particulates. The diverting step comprises providing the container with a diverter component configured to change the direction of at least a portion of flowing particulates that strike a surface of the diverter component. In one embodiment, the particulates comprise sand.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the embodiments of the present invention, reference is now made to the following descriptions taken in conjunction with the accompanying drawing, in which.

Figure 1A:
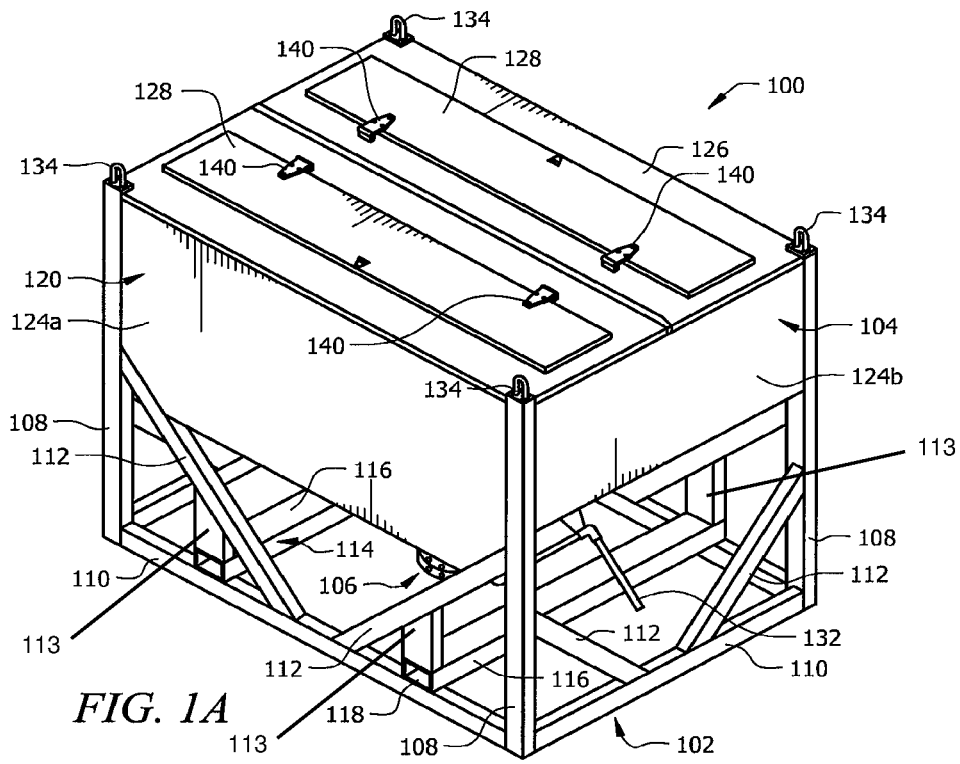
FIG. 1A is a perspective view of a first embodiment of a bulk material storage unit according to certain aspects of the present invention.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. Also, for simplification purposes, there may be only one exemplary instance, rather than all, is labeled. It should be understood, of course, that this disclosure is not limited to the particular embodiments illustrated herein.

DETAILED DESCRIPTION OF THE INVENTION

While embodiments of the present invention have a broad range of applications, they are particularly applicable for transportation of bulk materials using the railway or roadway systems. In railway transportation, the bulk material is typically loaded from silos at the source location into rail hopper cars for transport to the destination for use by the end users. If needs for the material is not immediate at the destination and storage is not available at that moment, these hopper cars usually end up sitting on the railway serving as temporary storage while taking up room on the rails that can lead to scheduling delays, thereby triggering a negative domino effect on the logistics. In roadway transportation, the bulk material is loaded from silos at the source location into truck trailers designed to hold bulk materials for transportation. Similar to railway transportation, if storage at the destination is lacking, the trucks need to remain there to serve as storage until the materials can be unloaded, thereby tying up resources in the logistical system.

Embodiments of the present invention provide bulk material storage units that can be placed on flatbed rail cars or flatbed trailers for transportation. The bulk material storage units of the present invention provide efficient storage of bulk material during transportations and upon arrival at the final destination.

Referring to FIGS. 1A-1F, one embodiment of the bulk material storage unit of the present invention is shown, storage component 100, which comprises frame component 102, storage component 104, and dispenser component 106. Frame component 102 provides support to storage component 104, which is attached to frame component 102. As shown in FIGS. 1A, 1C, 1D, and 1E, frame component 102 comprises vertical support members 108 preferably attached to the corners of storage component 104. In certain embodiments, frame component 102 also includes horizontal support members 110 extending between vertical support members 108. In the preferred embodiment, horizontal support members 110 are attached to vertical support members 108 near the end of vertical support members 108 toward the bottom of bulk material storage unit 100. In other embodiments, however, horizontal support members 110 can be placed at a higher position toward the top of bulk material storage unit 100 as appropriate. If additional support is needed or desired, frame component 102 can also include angled support members 112 extending between vertical support members 108 and horizontal support members 110. The angle of angled support members 112 can be varied as desired or required.

Figure 1B:
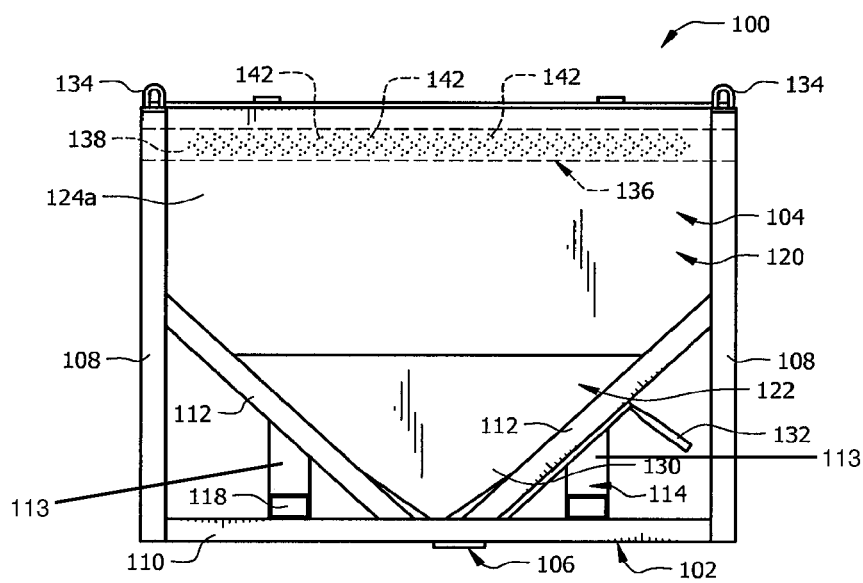
FIG. 1B is a front view of the bulk material storage unit of FIG. 1A.
Figure 1C:
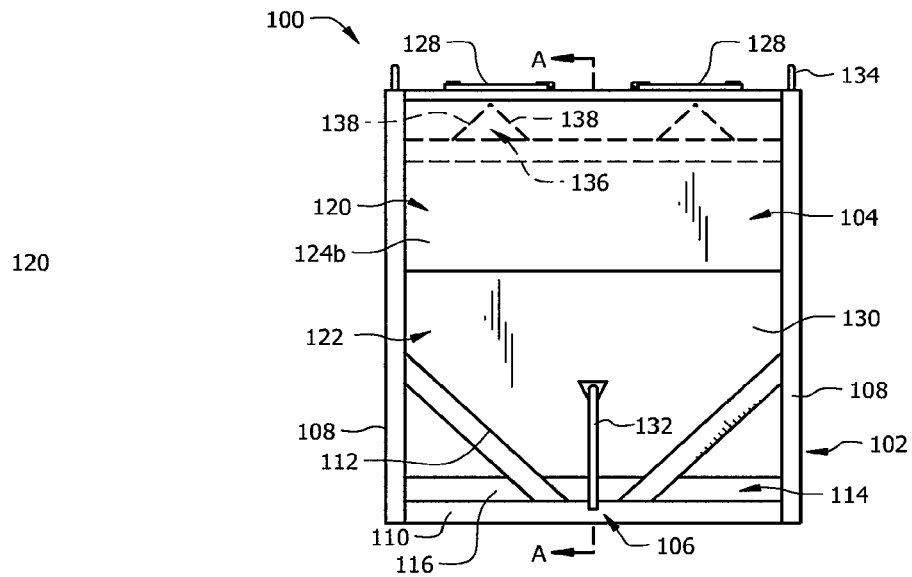
FIG. 1C is a side view of the bulk material storage unit of FIG. 1A.
Figure 1D:
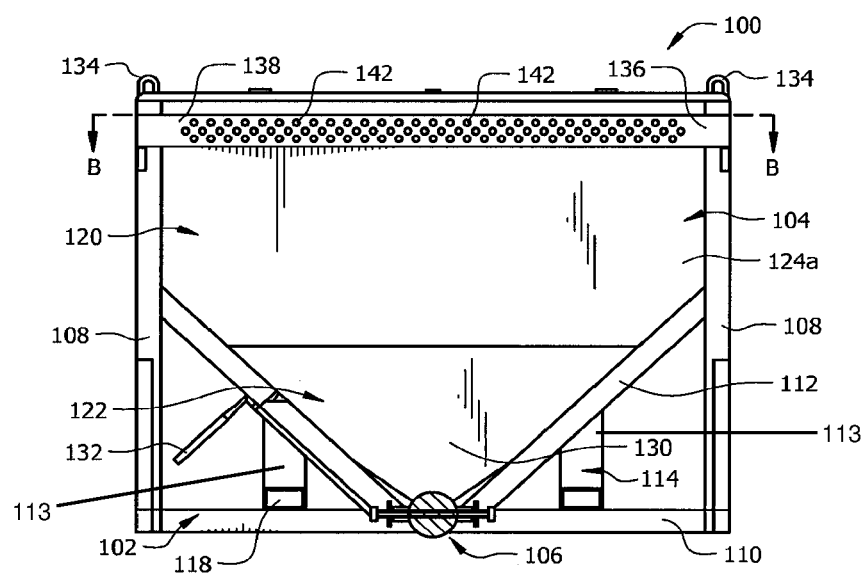
FIG. 1D is a cross-section view of the bulk material storage unit of FIG. 1C along line A-A.
Figure 4:
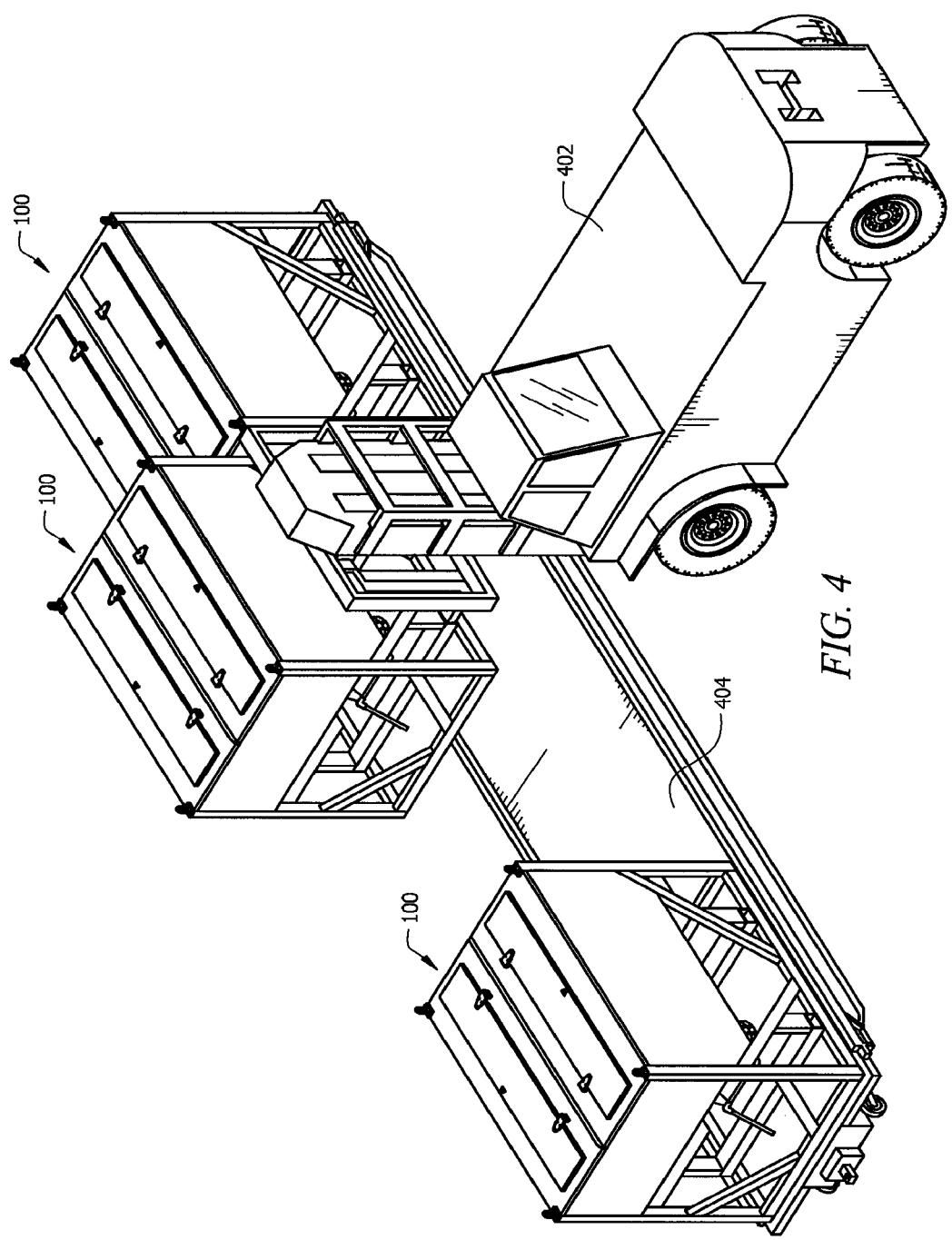
FIG. 4 is a perspective view of an exemplary embodiment to unload the bulk storage units shown in FIG. 1A from a flatbed according to certain aspects of the present invention.

In the preferred embodiment, bulk material storage unit 100 further comprises transfer component 114 attached to frame component 102 that allow bulk material storage unit 100 to be placed onto or unloaded from the transport equipment, e.g. flatbed, and placed at a convenient location to provide temporary and portable storage of the bulk material. In one embodiment, transfer component 114 allows bulk material storage unit 100 to be moved by a forklift, such as forklift 402 as shown in FIG. 4. As shown in FIGS. 1A-1D, transfer component 114 comprises bars 116 extending across opposite horizontal support members 110 and spaced apart the appropriate distance to accommodate the forklift forks from one another. Referring to FIGS. 1A-1B and 1D, bars 116 also include openings 118 to allow insertion of the forklift forks. In embodiments, vertical support members 113 are arranged on the transfer component 114. In the embodiment illustrated in FIGS. 1A and 1B, the vertical support members 113 extend between the transfer component 114 and the angled support members 112. Alternatively or in addition to transfer component 114, bulk material storage unit 100 can further include another transfer component, such as lift ring 134, attached to the top of vertical support members 108. Lift ring 134 preferably comprises standard commercially available products that can be bolted in or welded in place. The capacity for lift ring 134 preferably meet the applicable ASME and OSHA standards.

Referring to FIGS. 1A-1D, storage component 104 comprises rectangular portion 120 and tapered portion 122. Rectangular portion 120 comprises four side walls 124a and 124b and top surface 126. Side walls 124a extend between two vertical support members 108 along the length of bulk material storage unit 100. Side walls 124b extend between two vertical support members 108 along the width of bulk material storage unit 100. As shown, the height of side walls 124a is longer than the height of side walls 124b. In embodiments where angled support members 112 are used, the corners of side walls 124a can be removed to accommodate certain angled support members 112, as shown in FIGS. 1A-1B and 1D. Other embodiments can have different arrangements of side walls 124a and 124b.

Figure 1E:
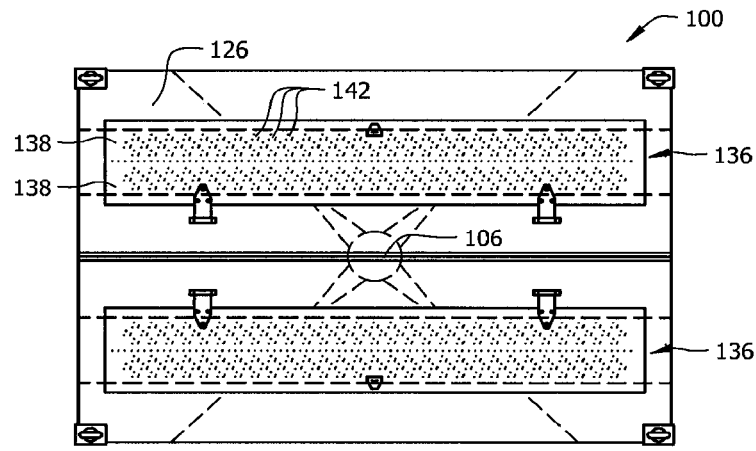
FIG. 1E is a top view of the bulk material storage unit of FIG. 1A.
Figure 1F:
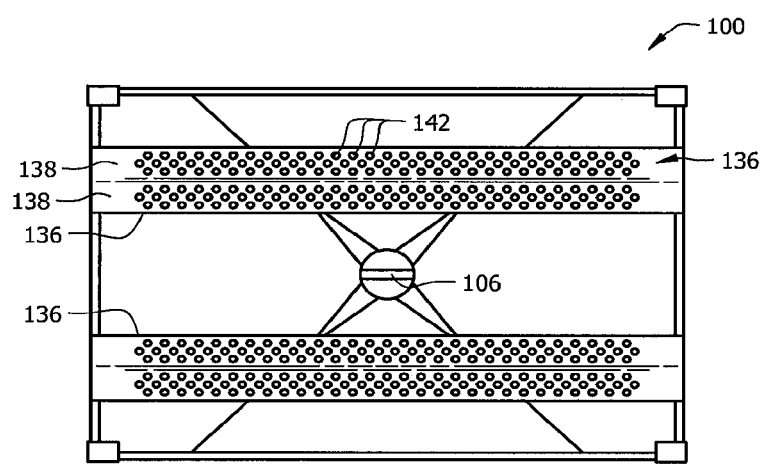
FIG. 1F is a cross section view of the bulk material storage unit of FIG. 1D along line B-B.
Figure 5:
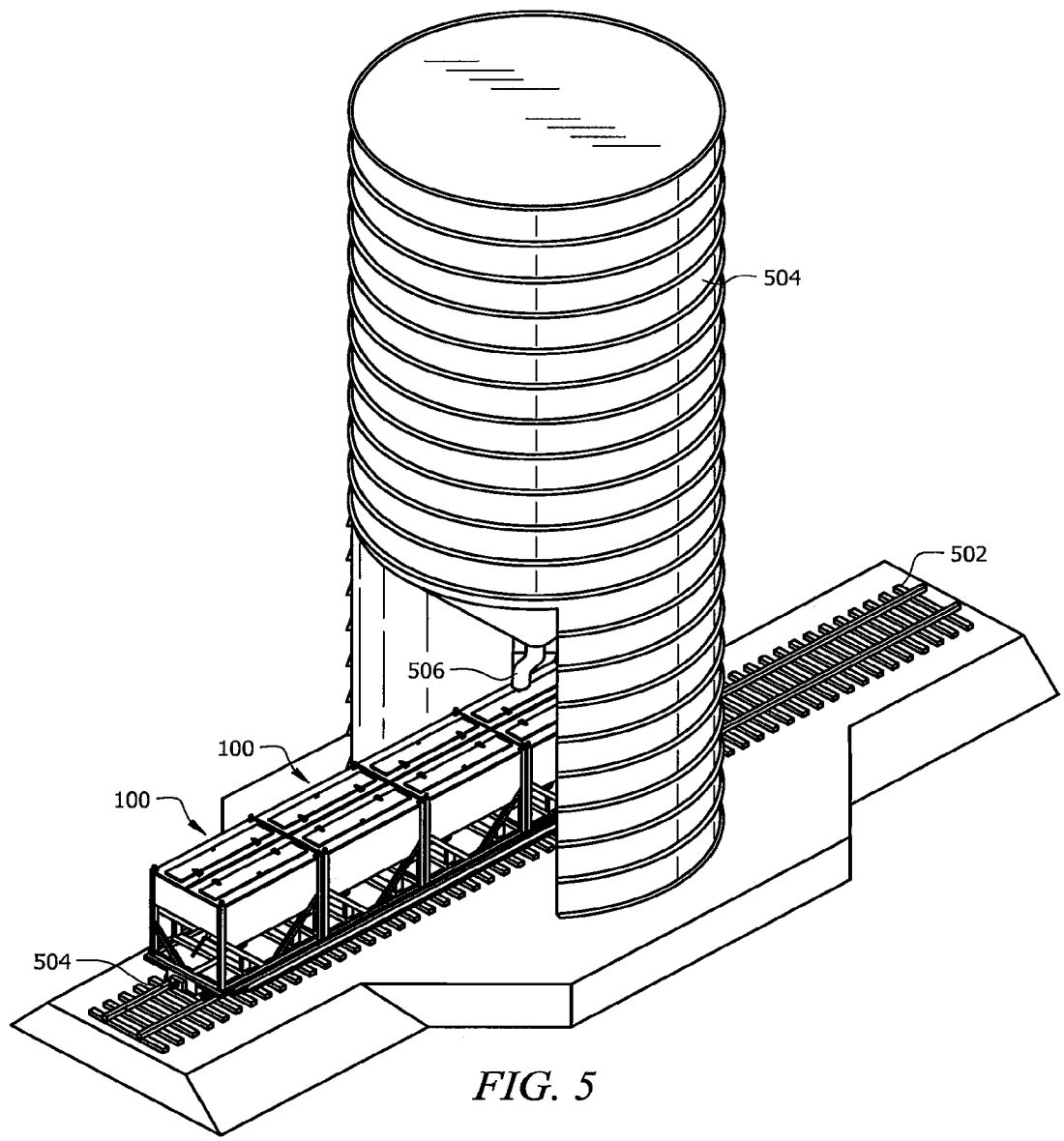
FIG. 5 is a perspective view of the bulk storage units shown in FIG. 1A transported on a flatbed rail car and being loaded with bulk material according to certain aspects of the present invention.

Top surface 126 has openings (not shown) that allow the bulk material to be loaded into storage component 104 from above, such as shown in FIG. 5. Referring to FIGS. 1A and 1C, top surface 126 comprises lid members 128 to regulate access to storage component 104 through these openings. Referring to FIG. 1A, lid members 128 lay on top surface 126 and is attached to top surface 126 via hinges 140. In this configuration, lid members 128 open away from top surface 126. However, in other embodiments, lid members 128 can have other known arrangements, such as opening into top surface 126. Referring to FIGS. 1A and 1E, lid members 128 have dimensions that are slightly larger than the corresponding openings of top surface 126 so they can sufficiently cover the openings and protect the bulk material within when closed. In the preferred embodiment, the openings of top surface 126 and corresponding lid member 128 have a length that extend substantially along the length of top surface 126. The openings of top surface 126 and corresponding lid members 128 have a width that is sufficient to allow bulk material to be efficiently loaded into storage component 104. Thus, in certain embodiments, the width can vary depending on the particular bulk material and/or equipment, but it is preferable that the width is designed to be compatible with as many equipment and/or bulk material as possible. The dimensions of lid members 128 can vary. For example, lid member 128 can have a width of about 12 inches, about 18 inches, about 24 inches, about 36 inches, or about 48 inches. For applications involving fine particles such as sand, the preferred width is about 36 inches. If two lid members 128 are used, both can have the same or different width as desired. In one embodiment, the width of lid member 128 is at least dependent on the size of the down spout used to fill bulk material container unit 100. In the preferred embodiment, the length of lid member 128 is about 10 feet. In one embodiment, lid member 128 can be made out of any suitable light weight and durable material such as formed plastic, or fiberglass. In an embodiment for use with finer particles such as sand, the preferred material for lid member 128 is steel or aluminum.

Referring to FIGS. 1A-1D, tapered portion 122 includes four tapered walls 130 extending from each side wall 124 in a narrowing manner toward the bottom of bulk material storage unit 100. To maximize the volume of storage component 104, tapered portion 122 preferably ends near the bottom of bulk material storage unit 100. In embodiments, the vertical support members 113 extend from the transfer component 114 to the tapered portion 122 such that the vertical support members 113 are at a lower elevation than the rectangular portion 120. In the preferred embodiment, the angle at which walls 130 taper is about 45 degrees; however, tapered walls 130 can have any other angles, such as about 60 degrees, about 55 degrees, about 50 degrees, about 40 degrees, about 35 degrees, about 30 degrees, or about 25 degrees. An angle of about 45 degrees is a minimum angle at which the full effect of gravity acts on the particulate material inside storage component 104. While angles less than about 45 degrees gradually reduce the vertical force of gravity as the angle approaches 0 degrees, certain embodiments can employ such angles to sacrifice the gravity effect for additional volume where rapid dispensing of the bulk material may not be critical. Likewise, angles greater than about 45 degrees may be beneficial in certain applications.

Referring to FIGS. 1A-1F, tapered portion 122 ends with an opening (not shown) near the bottom bulk material storage unit 100 to allow unloading of the bulk material from storage component 104. Dispensing component 106 is attached to the end of tapered portion 122 to regulate the flow of the bulk material from storage component 104. In the preferred embodiment, dispensing component 106 retains the bulk material in storage component 104 and prevent leakage of the bulk material in the closed position. Referring to FIGS. 1A-1E, dispensing component 106 preferably also allows for adjustment of the rate of flow of the bulk material within the range from the closed position to fully open using actuator member 132. In one embodiment, dispensing component 106 comprises a valve, preferably a butterfly valve according to ASME standards.

Figure 2A:
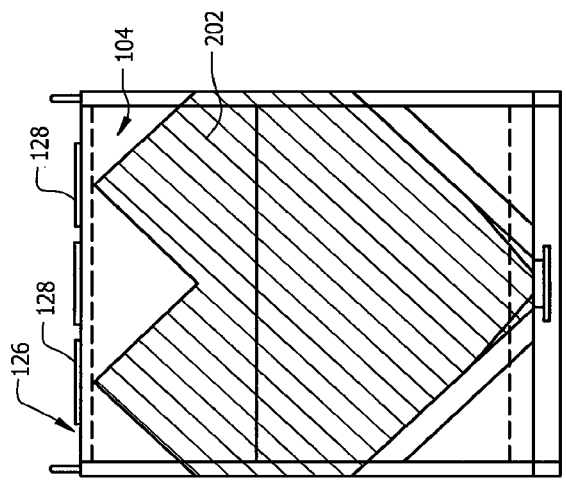
FIGS. 2A and 2B illustrate exemplary angles of repose for certain deposited bulk material and corresponding volumes.
Figure 2B:
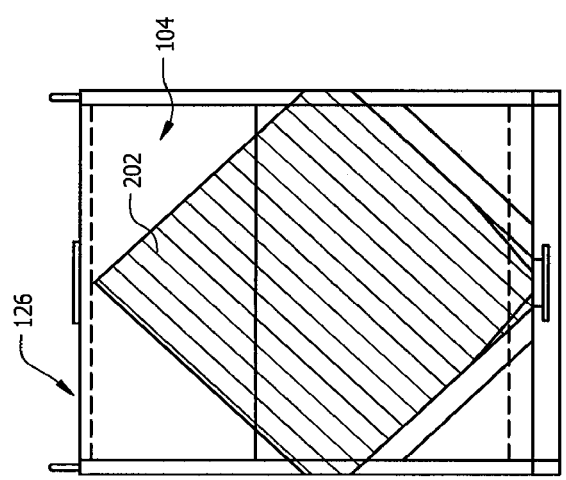

Referring to FIGS. 1B-1F, in the preferred embodiment, to maximize the volume of bulk or particulate material that can be loaded into storage component 104, bulk material storage unit 100 further comprises diverter components 136 positioned below lid members 128. Diverter components 136 divert the bulk material pouring in from the top toward side walls 124 to minimize the angle of repose or the conical pile that typically forms when bulk or particulate material is poured through openings of top surface 126. FIGS. 2A and 2B demonstrate the angle of repose of bulk material 202 when poured through top surface 126 having one opening/one lid member 128 or two openings/two lid members 128, respectively, into storage component without any diverter component 136 installed. As shown in FIG. 2B, using top surface 126 with two openings can increase the volume of material that can be poured into storage component 104 as compared to only using one opening as shown in FIG. 2A.

The two openings allow bulk material to be introduced to the sides of storage component 104, taking advantage of space near the top of storage component 104 that would be unavailable if only one opening was used. There are many factors that affect the angle of repose, or the internal angle between the surface of the pile and the horizontal surface, such as density, surface area and shapes of the particles, and the coefficient of friction of the material. Material with a low angle of repose forms flatter piles than material with a high angle of repose. As such, the decision to employ one or two openings, as well as corresponding diverter components 136, may be more critical in maximizing the volume of bulk materials with higher angle of repose that can be loaded as compared to bulk materials with lower angle of repose.

Referring to FIGS. 1B-1F and 3A-3B, each diverter component 136 preferably includes two ends attached to the inner surface of side walls 124b. A body extend between the two attached ends. The length of diverter component 136 preferably generally match the length of the respective opening of top surface 126 covered by lid member 128. The width of diverter component 136 (the maximum distance across diverter component 136) can be larger or smaller than the width of the respective opening of top surface 126. In one embodiment, the width of diverter component 136 is between about 12 inches and 48 inches, and more particularly, about 12 inches, about 18 inches, about 24 inches, about 36 inches, or about 48. In an exemplary embodiment, when used with down spouts having a width of about 24 inches, divert component 136 preferably has a width of about 24 inches, and for down spouts of about 36 inches, the width of diverter component 136 is about 36 inches.

Figure 3A:
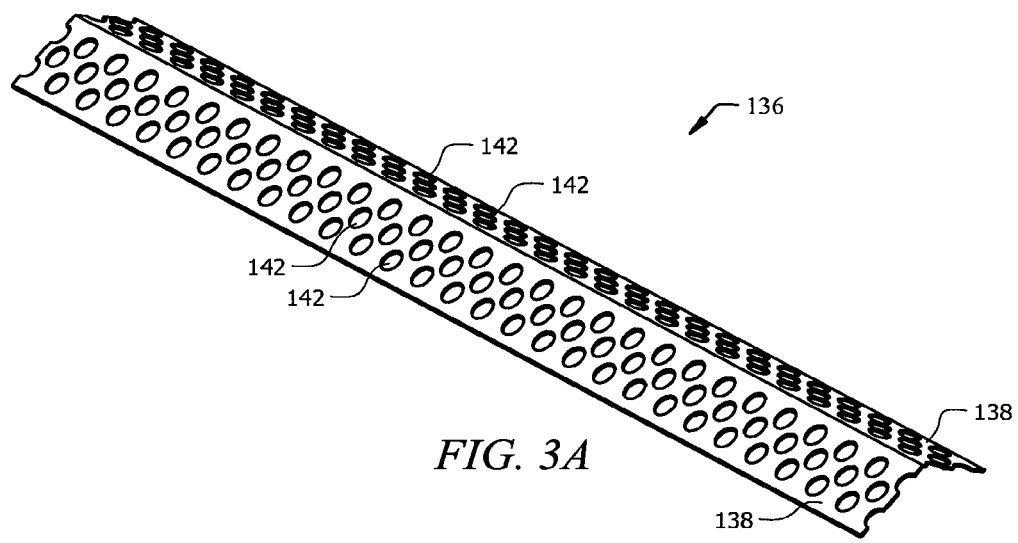
FIG. 3A is a perspective view of an exemplary embodiment of a diverter component of a bulk material storage according to certain aspects of the present invention.
Figure 3B:
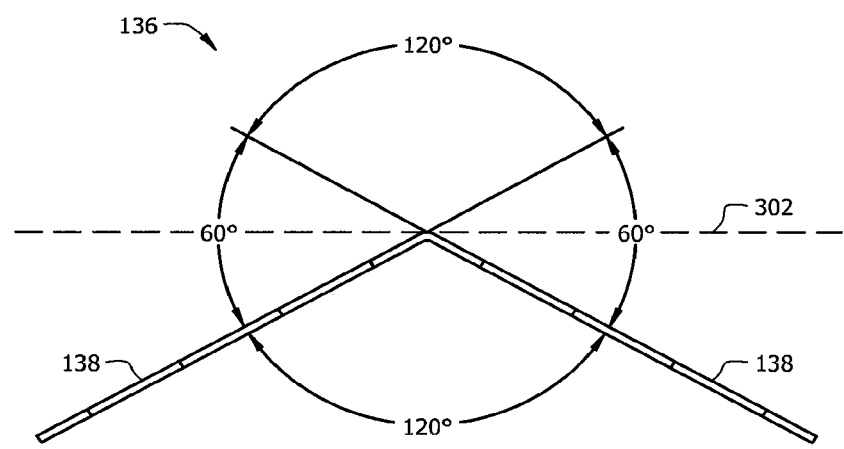
FIG. 3B is an end view of the diverter component of FIG. 3A.

In another embodiment, the body of diverter component 136 has two surfaces 138 angled away from each other that reduce the conical piling below the loading point of the bulk material. The incoming particulates hit angled surfaces 138 and get deflected toward the sides of storage component 104. Thus, the incoming bulk material fills up storage component 104 more evenly, thereby making more volume near the top of storage component 104 available for use as storage. In addition, diverter component 136 preferably comprises a plurality of apertures 142 to allow bulk material particulates to pass through. Referring to FIGS. 3A and 3B, diverter component 136 has three rows of apertures 142, and surfaces 138 are at an angle of about 30 degrees from the horizontal, as indicated by line 302. This can vary with different industries and particulate materials, ranging from about 27 degrees to about 89 degrees. For fine particles like sand and other particles with properties similar to sand, the preferred angle is about 30 degrees. In one embodiment, particularly for sand, the surface area provided by apertures 142 is about half of the total surface area of surfaces 138. As shown, apertures 142 has a diameter of about 1.5 inches, which is particularly suitable to sand and other similar fine particles. The diameter and surface area of apertures 142 can vary with other industries and materials, where at least the density and permeability of the particulate material being loaded. It is understood that the location, size, and/or shape of apertures 142 can vary to optimally reduce of the angle of repose of the material being loaded, thereby maximizing the use of space within storage component 104. In particular, each of the position, size, and shape of apertures 142 can each be varied. For instance, an exemplary diverter component can have apertures 142 of various sizes and/or shapes that are positioned in uniform or nonuniform arrangement.

Further, it should be understood that the illustrated diverter component 136 with angled surfaces 138 is merely illustrative and not intended to limit the present invention. Diverter component 136 deflects particulates toward the walls of storage component 104, thereby disrupting the flow of particulates into storage component 104 that can form a conical pile if left undisturbed. The deflection of particulates can be implemented in other forms within the skill of one of ordinary skill in the art. For example, instead of or in addition to apertures 142, angled surfaces 138 can comprise a plurality of fingers where certain particulates would be deflected when they hit the surface of these fingers while others fall through the gaps between the fingers. Another example includes a cylinder with a plurality of protrusions that is configured to spin as particulates are flowing in and hitting the surfaces of the cylinder.

In the preferred embodiment, for every opening of top surface 126 and lid member 128, there is provided a divert component 136 placed below the respective opening of the top surface 126 to direct incoming bulk material to the side and minimize the angle of repose. Also, in other embodiments, such as that shown in FIG. 4, top surface 126 can comprise one opening (not shown) and one lid member 128. Storage component 104 of bulk material storage unit of FIG. 4 preferably includes one corresponding diverter component 136 placed below the single lid member 128.

In the preferred embodiment, bulk material storage unit 100 is sized to be compatible with equipment at the source location, the transport equipment, and equipment at the destination. Bulk material storage unit 100 is preferably adapted to fit flatbed rail cars for rail transportation or flatbed trailers for roadway transportation. The preferred bulk material storage unit has dimensions that are compatible with both railway and roadway transportation equipment for versatility. Based on dimensions of flatbeds currently used for both railway and roadway transport and roadway regulations governing the height of trailers, the preferred bulk material storage unit 100 has a length of less than about 12 feet, a width of less than about 8 feet 6 inches, and a height of less than about 10 feet. In particular, bulk material storage unit 100 more preferably has a length of about 12 feet, a width of about 8 feet 4 inches, a height of about 9 feet 9¹¹⁄₁₆ inches, not including any lift ring 134. In one embodiment, diverter component 136 is attached to the interior of side walls 124b through welding or it can be bolted to side walls 124b. In certain embodiments, angular supports can be used to reinforce the anchoring at the location of attachment. Diverter component 136 is preferably attached to side walls 124b so that the distance between the peak angle of diverter component 136 and top surface 126 of about 1 to 18 inches. The specific distance can vary depending on the density and angle of deflection of the product being loaded into bulk material storage unit 100. For applications involving fine particles such as sand, the preferred distance from top surface 126 is about 3 inches determined based at least on the density of sand. Sand products can vary from about 8-16 mesh to about 100 mesh in size. Storage component 104 preferably is configured with dimensions to provide it with the capacity to hold up to 675 cubic feet of volume. Components of bulk material storage unit 100 can be made of durable materials such as steel, aluminum, fiberglass, plastic, or a combination thereof.

Figure 6:
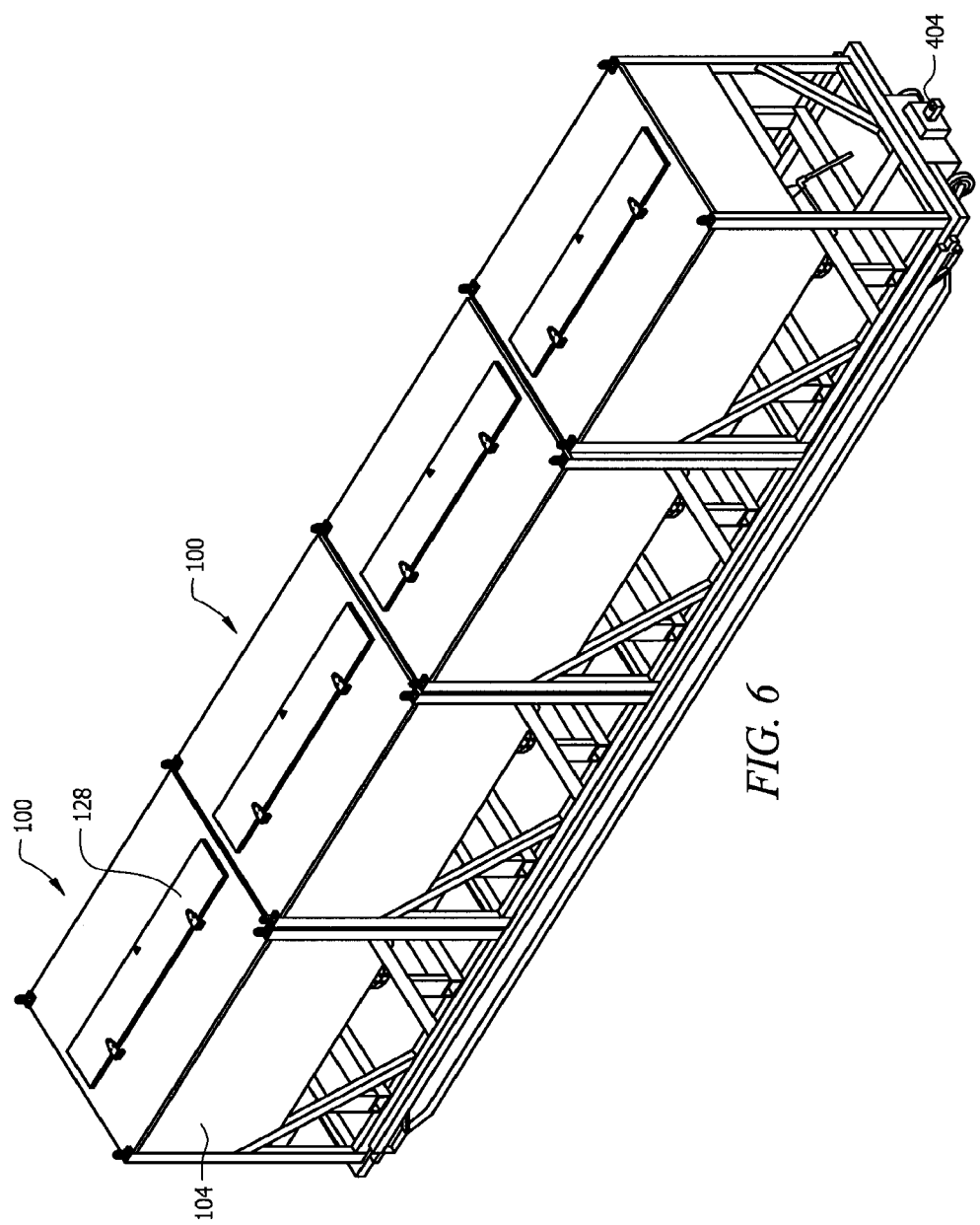
FIG. 6 is a perspective view of exemplary bulk storage units of the present invention transported on a flatbed rail car.
Figure 7:
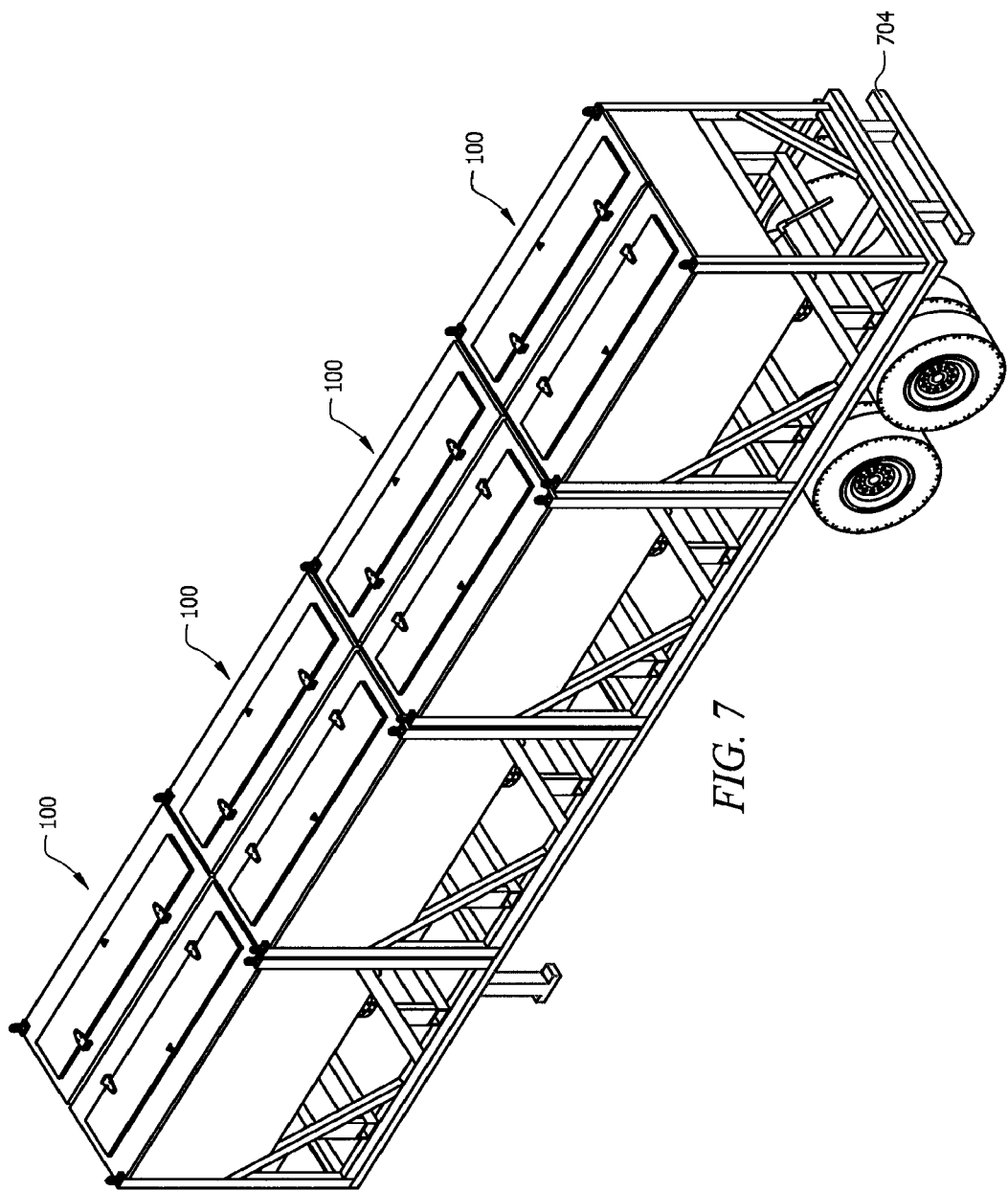
FIG. 7 is a perspective view of the bulk storage units of FIG. 1A transported on a flatbed trailer.

Referring to FIGS. 4-7, four bulk material storage units 100 can fit on a flatbed that is about 48 feet long, whether for a rail car, e.g., rail car 404 as shown in FIGS. 4-6, or a trailer, e.g., trailer 704, as shown in FIG. 7. Referring to FIG. 4, bulk material storage units 100 can be transferred to and from flatbed 406, whether transported by rail or road, using forklift 402. Alternatively or in addition, bulk material storage units 100 can be transferred to and from flatbed 406 using a crane or similar lifting device through transfer component 114. While four bulk material storage units 100 can be placed on a flatbed of about 48 feet long, certain transportation regulations governing weight, particularly for roadways, may restrict the actual number of full bulk material storage units 100 that can be hauled by a particular at any one time. If bulk material storage units 100 are empty or not fully filled. This can expedite the logistics process and cut transport costs by enabling multiple empty bulk material storage units 100 to be returned by one truck for every one full bulk material storage unit 100 delivered, where conventional trailers cannot provide this increased capability.

Figure 8:
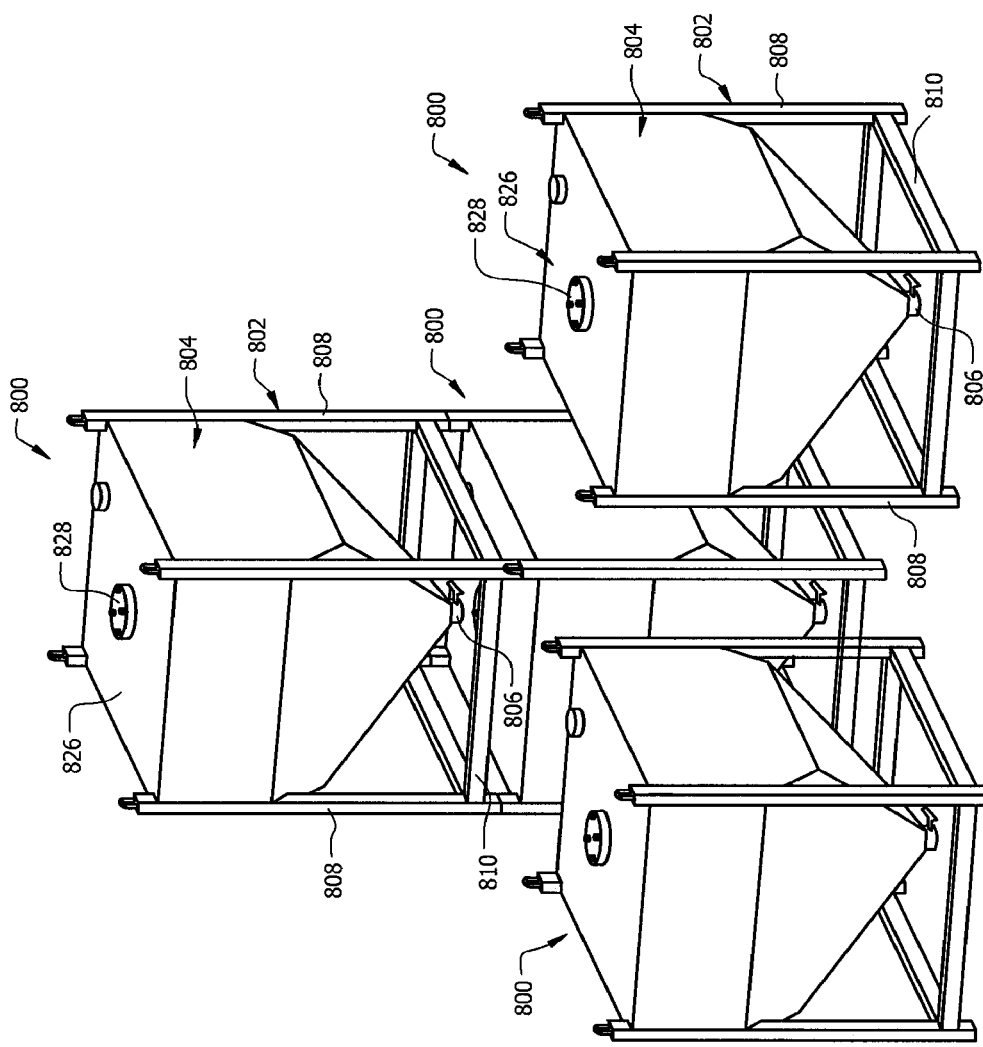
FIG. 8 is a perspective view of a second embodiment of a material storage unit according to certain aspects of the present invention.

Referring to FIG. 8, according to another aspect, there is provided a second embodiment of the bulk material storage unit of the present invention, bulk material storage unit 800, which is similar to bulk material storage unit 100 of FIGS. 1A-1F. Certain descriptions of bulk material storage unit 100 are also applicable to bulk material storage unit 100, such as dimensions, composition materials, and manners of transfer or transportation. Bulk material storage unit 800 also comprises frame component 802, storage component 804, and dispenser component 806. Frame component 802, however, does not include any angled support members. Further, the arrangements of the components of bulk material storage units 800 are modified to allow bulk material storage to stack on top of one another. As shown, storage component 804 and horizontal support members 810 are respectively attached to frame component 802 such that a portion of the top and bottom of each vertical support member 808 are available so the top of vertical support members 808 of one storage unit 800 can engage and attach to the bottom of vertical support members 808 of another storage unit 800. As shown, bulk material storage unit 800 also includes lid member 828 placed generally in the center of top surface 826 that is round instead of rectangular like lid members 128 of bulk material storage unit 100. The shape and location of lid member 828 can allow for transferring of bulk material from a higher stacked storage unit 800 to a lower stacked storage unit 800. It is understood that any one or more of these modifications can be made to bulk material storage unit 100. Other known modifications can also be made to bulk material storage unit 100 to make it stackable.

Figure 9:
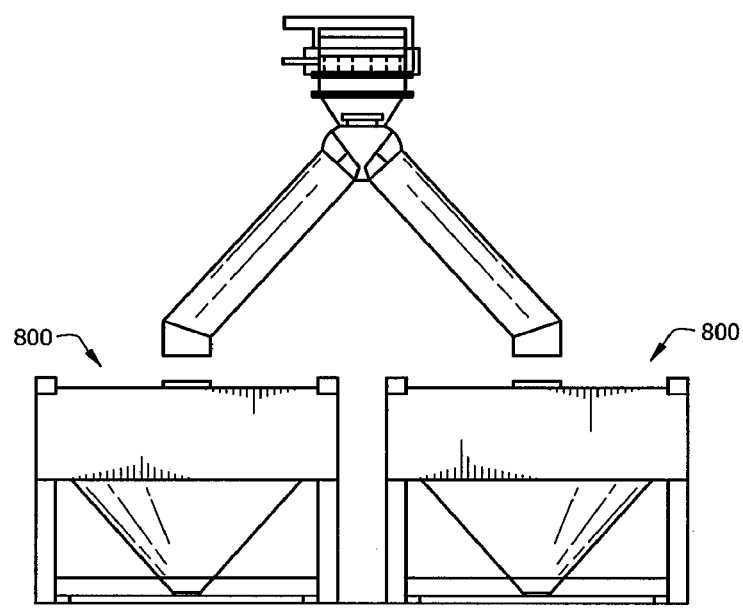
FIG. 9 is a side view of an exemplary embodiment to load the bulk material storage unit of FIG. 8.
Figure 10:
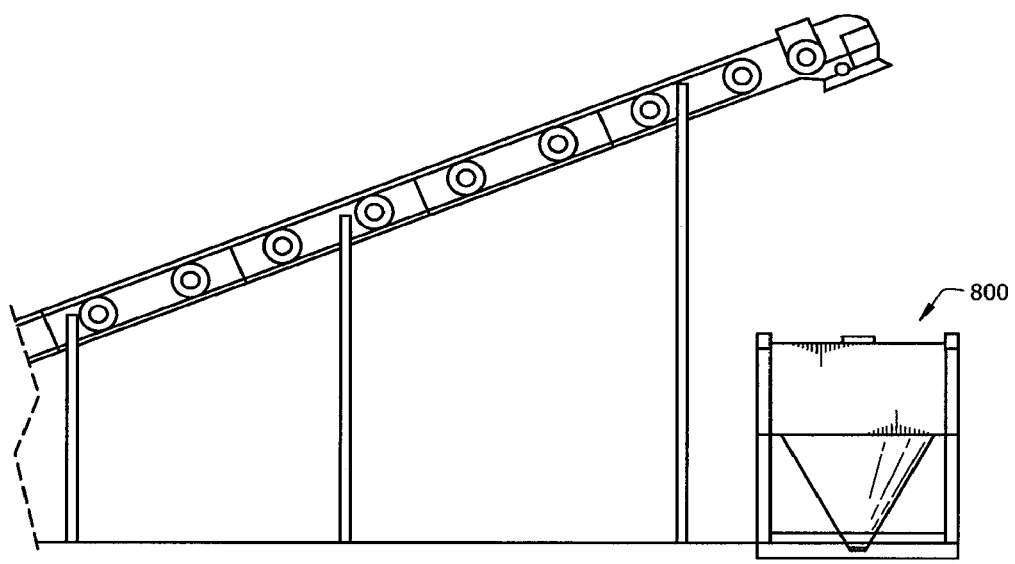
FIG. 10 is a side view of another exemplary embodiment to load the bulk material storage unit of FIG. 8.

According to another aspect of the present invention, there is provided a method of transporting bulk material using embodiments of the bulk material storage unit disclosed herein. The transport of bulk material begins with loading of bulk material into the bulk material storage units at the origin, whether it is the source location where the bulk material is collected, an off-site storage location, an intermediate transport point, etc. FIG. 5 shows one way of loading of bulk material storage units 100 with two lid members 128 hauled by rail car 404. Railway 502 runs through silo 504 allowing successive bulk material storage units 100 to be pulled to the proper position underneath dispenser 506 of silo 504 to receive the bulk material. FIGS. 9 and 10 show exemplary ways of filling bulk material storage unit 800.

Once the bulk material storage units are filled, they are transported to the destination via the particular transportation mode, e.g., rail cars or trucks. The destination can be the final delivery point for the end-user, an intermediate transport point, etc. If storage of the bulk material, whether permanent or temporary, is needed at the destination, the bulk material storage units can be unloaded from the rail cars or trucks and transferred to the desired location. Referring to FIG. 4, unloading of bulk material storage units 100 can be achieved with forklift 402. Embodiments of the present invention allow for storage to be stored immediately without requiring existing storage infrastructures at the destination, thereby freeing the transportation equipment to be utilized elsewhere, preventing obstruction of the logistics flow, and reducing costs associated with constructing storage structures. Embodiments of the present invention also eliminate any costs or material loss associated with the transfer of bulk material from conventional shipping containers to a storage container by providing bulk material storage units that can serve as both. If the stored bulk material needs to be moved to another location or transported again via rail way or road way, the bulk material storage units can be moved via the transfer components as described above. Embodiments of the present invention also allow for straightforward transfer of only a portion of the stored bulk material by transferring only the desired number of bulk material storage units. Further, the portability of embodiments of the present invention provides storage flexibilities to adapt to the changing market where stored bulk material and/or storage space can be moved cost effectively to other regions.

As mentioned, embodiments of the present invention are applicable to meet needs of industries that involve storage and transport of particulate materials, such as sand, grains, ores, gravel, stone, etc. Certain embodiments, however, are particularly applicable for storing and transporting sand or similar fine particles. A specific industry that requires a large amount of sand to be delivered from the mines is the oil and gas industry, which uses the sand as proppants in hydraulic fracturing at well sites. While the following descriptions specifically mention sand, it is understood they can be similarly applicable to other industries and particulate materials. Current rail transportation of sand uses rail hopper cars which are not designed to retain fine particles like sand, which often lead to product loss during transportation. This loss is typically referred to as variance. Variance in the oil and gas industry today ranges approximately 3% to 10%. Embodiments of the present invention can reduce or eliminate this variance because they are configured to prevent leakage.

When sand is delivered to the well site, it is typically injected into the well using pneumatic trailers. Embodiments of the present invention can reduce the number of pneumatic trailers used by allowing the sand to be stored closer to the well, thereby making the sand more accessible. Embodiments of the present invention can also facilitate in eliminating use of the pneumatic trailers through the use of an alternative sand injection that can take advantage of the cone shape of the vessel. It is designed to use gravity as one energy source to introduce the sand into the well.

Sand has different angles of repose depending on its properties. Dry sand has an angle of repose of about 34 degrees, moist sand has an angle of repose of about 15 degrees and 30 degrees, and wet sand has an angle of repose of about 45 degrees. As discussed above, more volume of moist sand can be filled as compared to dry and wet sand because moist sand has the lowest angle of repose. Specifically, for a bulk material storage unit with dimensions of about 12 feet in length, about 8 feet 4 inches in width, and about 9 feet and 9⅙ inches in height, the volume for a 45 degrees angle of repose for a single opening surface, as shown in FIG. 2A, is about 360 cubic feet, and the volume for a 34 degrees angle of repose is 425 cubic feet. For a two-opening surface, as shown in FIG. 2B, the volume for a 45 degree angle of repose is 460 cubic feet compared to the volume for a 34 degree angle of repose is 493 cubic feet.

As described, the volume of sand that can be loaded is increased by using two openings. This volume can further be increased by using diverter components 136, as described above. In one embodiment, under normal conditions, an increase of about 2,000 to 6,000 lbs. can be achieved for sand products. Referring to FIGS. 3A and 3B, as described above, diverter component 136 has three rows of apertures 142, and surfaces 138 are at an angle of about 30 degrees from the horizontal, as indicated by line 302. The surface area provided by apertures 142 is about half of the total surface area of surfaces 138. As shown, apertures 142 has a diameter of about 1.5 inches, which is particularly suitable to sand and other similar fine particles. For other industries and particulate materials, diverter components 136 are reconfigured to suit the conditions of such industries and materials, including but not limited to modifications to the dimensions, angle of surfaces 138, surface area of apertures 142, number and arrangement of apertures 142, and diameter of apertures 142.

The present application is a divisional which claims priority to and the benefit of U.S. application Ser. No. 13/625,675, filed on Sep. 24, 2012, and titled "SYSTEMS AND METHODS FOR BULK MATERIAL STORAGE AND/OR TRANSPORT," which claims priority to U.S. Provisional Application No. 61/538,616, filed on Sep. 23, 2011, and titled PORTABLE SHIPPING/STORAGE CONTAINER," each of which is incorporated herein by reference in its entirety.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A bulk material storage container unit comprising:
 a storage component that includes a generally rectangular portion and a tapered portion, the generally rectangular portion having a plurality of side walls and the tapered portion having a plurality of tapered walls extending from each side wall of the plurality of side walls in a narrowing manner toward an opening to direct bulk material stored within an interior volume of the storage component toward the opening, the bulk material being proppant used for hydraulic fracturing;
 a top surface attached to said storage component, said top surface including one or more openings and a lid member corresponding to and positioned to overlie the one or more openings when in a closed position;
 a frame component attached to said storage component, said frame component including a plurality of storage component support members to provide support to the storage component while the storage component is filled with bulk material, and a plurality of vertical storage component support members attached to corners of the storage component and extending from a top end at the top surface to a bottom end below the opening in the storage component;
 one or more transfer components positioned proximate the opening to facilitate movement of the bulk material storage container unit;
 one or more vertical support members positioned to underlie the plurality of tapered walls and extend vertically from the one or more transfer components to a vertical extent below a bottom elevation of the rectangular portion of the storage component; and
 a dispenser component attached to said storage component and being moveable between an open position and a closed position to regulate the flow of proppant from the storage component, the dispenser component positioned proximate a bottom of the frame component.

2. The bulk material storage container unit of claim 1, further comprising:
 a diverter component attached to the storage component, said diverter component reducing the angle of repose of particulates entering the storage component through the one or more openings of the top surface.

3. The bulk material storage container unit of claim 1, further comprising a length of about 12 feet or less, a width of less than about 8 feet 6 inches, and a height of less than about 10 feet and wherein the storage component has a capacity of up to 675 cubic feet of volume.

4. The bulk material storage container unit of claim 3, wherein said length is about 12 feet said width is about 8 feet 4 inches, and said height is about 9 feet 9 1/16 inches.

5. The bulk material storage container unit of claim 1, wherein said plurality of storage component support members comprise one or more of:
 a plurality of vertical storage component support members, a plurality of horizontal storage component support members, and a plurality of angled storage component support members.

6. The bulk material storage container unit of claim 1, wherein the one or more transfer components are arranged on the frame component, the one or more transfer components being positioned to accommodate forks from a forklift to enable movement of the bulk material storage container unit.

7. The bulk material storage container unit of claim 1, wherein each tapered wall of the plurality of tapered walls are disposed at an angle with respect to a horizontal surface said angle being in the range between about 25 degrees and 60 degrees.

8. The bulk material storage container unit of claim 1, wherein the plurality of side walls comprises two pairs of side walls, a first pair of side walls having a first height and a second pair of side walls having a second height, the first height and the second height being different.

9. The bulk material storage container unit of claim 1, wherein the frame component is arranged about the storage component such that an open area is formed adjacent the tapered walls to enable visual access of an outer surface of the tapered walls through the open area.

10. The bulk material storage container unit of claim 1, wherein the plurality of storage component support members comprises a plurality of vertical storage component support members extending from the top surface to a bottom, the plurality of vertical storage component support members arranged to receive and support a second bulk material storage container unit stacked on top of the bulk material storage container unit, the plurality of vertical storage component support members of the second bulk material storage container unit attaching to the plurality of vertical storage component support members of the bulk material storage container unit.

11. The bulk material storage container unit of claim 1, wherein the plurality of storage component support members further comprises a plurality of angled storage component support members positioned in contact with the storage component to provide additional support to the bulk material storage container unit.

12. A bulk material storage container unit comprising:
a storage component that includes a generally rectangular portion and a tapered portion, the generally rectangular portion having a plurality of side walls and the tapered portion having a plurality of tapered walls extending from each side wall of the plurality of side walls in a narrowing manner toward an opening to direct bulk material stored within an interior volume of the storage component toward the opening, the bulk material being proppant used for hydraulic fracturing, the plurality of side walls including two pairs of side walls, a first pair of side walls having a first height and the second pair of side walls having a second height, the first height and the second height being different, each tapered wall of the plurality of tapered walls being disposed at an angle with respect to a horizontal surface, the being in the range between 25 degrees and 60 degrees;
a top surface attached to said storage component, said top surface including one or more openings and a lid member corresponding to and positioned to overlie the one or more openings when in a closed position;
a frame component attached to said storage component, said frame component including a plurality of storage component support members to provide support to the storage component while the storage component is filled with bulk material, the frame component being arranged about the storage component such that an open area is formed adjacent the tapered walls to enable visual access of an outer surface of the tapered walls through the open area, wherein the plurality of storage support members includes a plurality of vertical storage component support members attached to corners of the storage component and extending from a top end at the top surface to a bottom end below the opening in storage component;
one or more transfer components positioned proximate the opening to facilitate movement of the bulk material storage container unit;
one or more vertical support members positioned to underlie the plurality of tapered walls and extend vertically from the one or more transfer components to a vertical extent below a bottom elevation of the rectangular portion of the storage component; and
a dispenser component attached to said storage component and being moveable between an open position and a closed position to regulate the flow of proppant from the storage component, the dispenser component positioned proximate a bottom of the frame component.

13. The bulk material storage container unit of claim 12, wherein said plurality of storage component support members comprise one or more of:
a plurality of vertical storage component support members, a plurality of horizontal storage component support members, and a plurality of angled storage component support members.

14. The bulk material storage container unit of claim 13, wherein the one or more transfer components are arranged on the frame component, the one or more transfer components being positioned to accommodate forks from a forklift to enable movement of the bulk material storage container unit.

15. The bulk material storage container unit of claim 12, wherein the plurality of storage component support members comprises a plurality of vertical storage component support members extending from the top surface to a bottom, the plurality of vertical storage component support members arranged to receive and support a second bulk material storage container unit stacked on top of the bulk material storage container unit, the plurality of vertical storage component support members of the second bulk material storage container unit attaching to the plurality of vertical storage component support members of the bulk material storage container unit.

16. The bulk material storage container unit of claim 15, wherein the plurality of storage component support members further comprises a plurality of angled storage component support members positioned in contact with the storage component to provide additional support to the bulk material storage container unit.

17. The bulk material storage container unit of claim 5, wherein the one or more vertical support members extend vertically from the one or more transfer components to one or more of the plurality of angled storage component support members.

18. The bulk material storage container unit of claim 13, wherein the one or more vertical support members extend vertically from the one or more transfer components to one or more of the plurality of angled storage component support members.

* * * * *